United States Patent [19]
Castelaz

[11] Patent Number: 5,598,510
[45] Date of Patent: Jan. 28, 1997

[54] SELF ORGANIZING ADAPTIVE REPLICATE (SOAR)

[75] Inventor: Patrick F. Castelaz, Yorba Linda, Calif.

[73] Assignee: Loma Linda University Medical Center, Loma Linda, Calif.

[21] Appl. No.: 137,569

[22] Filed: Oct. 18, 1993

[51] Int. Cl.[6] .................. G06E 1/00; G06E 3/00; G06F 15/18

[52] U.S. Cl. .................. 395/23; 395/21; 395/20; 382/157

[58] Field of Search .................. 395/20–27; 382/12–15, 382/155–159; 348/222; 364/724.01

[56] References Cited

U.S. PATENT DOCUMENTS

| | | | |
|---|---|---|---|
| 5,214,746 | 5/1993 | Fogel et al. | 395/23 |
| 5,228,113 | 7/1993 | Shelton | 395/23 |
| 5,276,771 | 1/1994 | Manukian et al. | 395/24 |
| 5,335,291 | 8/1994 | Kramer et al. | 382/14 |
| 5,376,962 | 12/1994 | Zortea | 348/222 |
| 5,408,424 | 4/1995 | Lo | 364/724.01 |

OTHER PUBLICATIONS

Lu, "Pattern classification using self–organizing feature maps"; Nueral Networks, 1990 IEEE International conference, pp. 471–480, 1990.

Mann et al, "A self–organizing Neural net chip"; Custon Integrated Circuits conference, 1988, pp. 10.3.1–10.3.5, 1988.

*Primary Examiner*—Robert W. Downs
*Assistant Examiner*—Tariq Hafiz
*Attorney, Agent, or Firm*—Fish & Richardson P.C.

[57] ABSTRACT

A self-organizing adaptive replicated (SOAR) for creating a replicate of human expert behavior. The SOAR can be embedded invisibly within multiple types of systems to observe, adapt and grow to emulate a user's interactive behavior and performance level. The system yields near equivalent responses to near equivalent stimuli in real time. The SOAR is based on a three layer perceptron type architecture which guarantees arbitrary M to N mapping of continuous valued spaces. The architecture uses a competitive, additive, and layer independent learning rule which insures excellent rapid learning. A self-organizing, adaptive algorithm permits the SOAR to adapt to the true classification space. The SOAR has applications in areas such a speech recognition, target detection, pattern recognition of multi-feature data, electro-mechanical subsystem control and resource allocation and optimization.

18 Claims, 22 Drawing Sheets

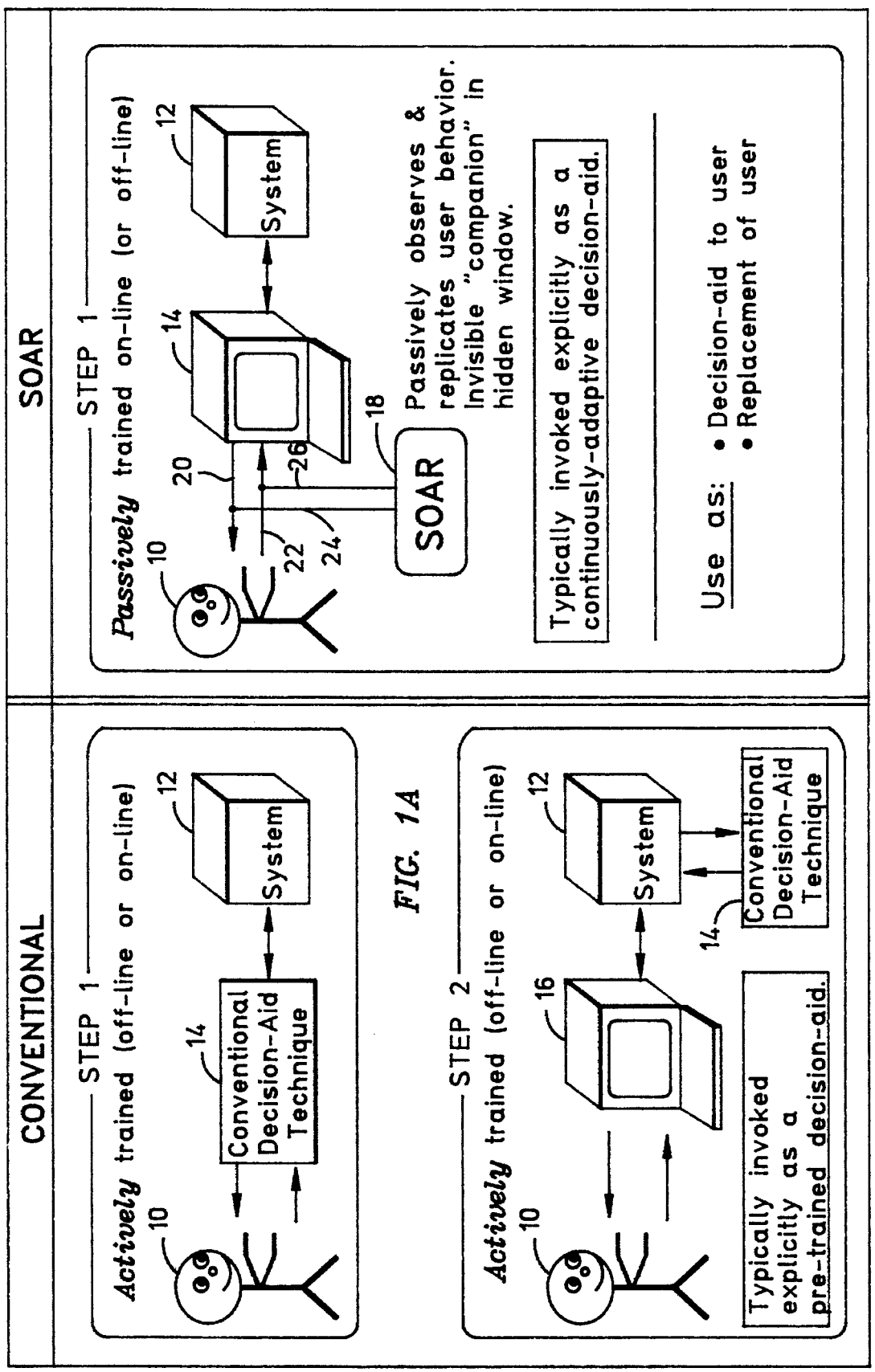

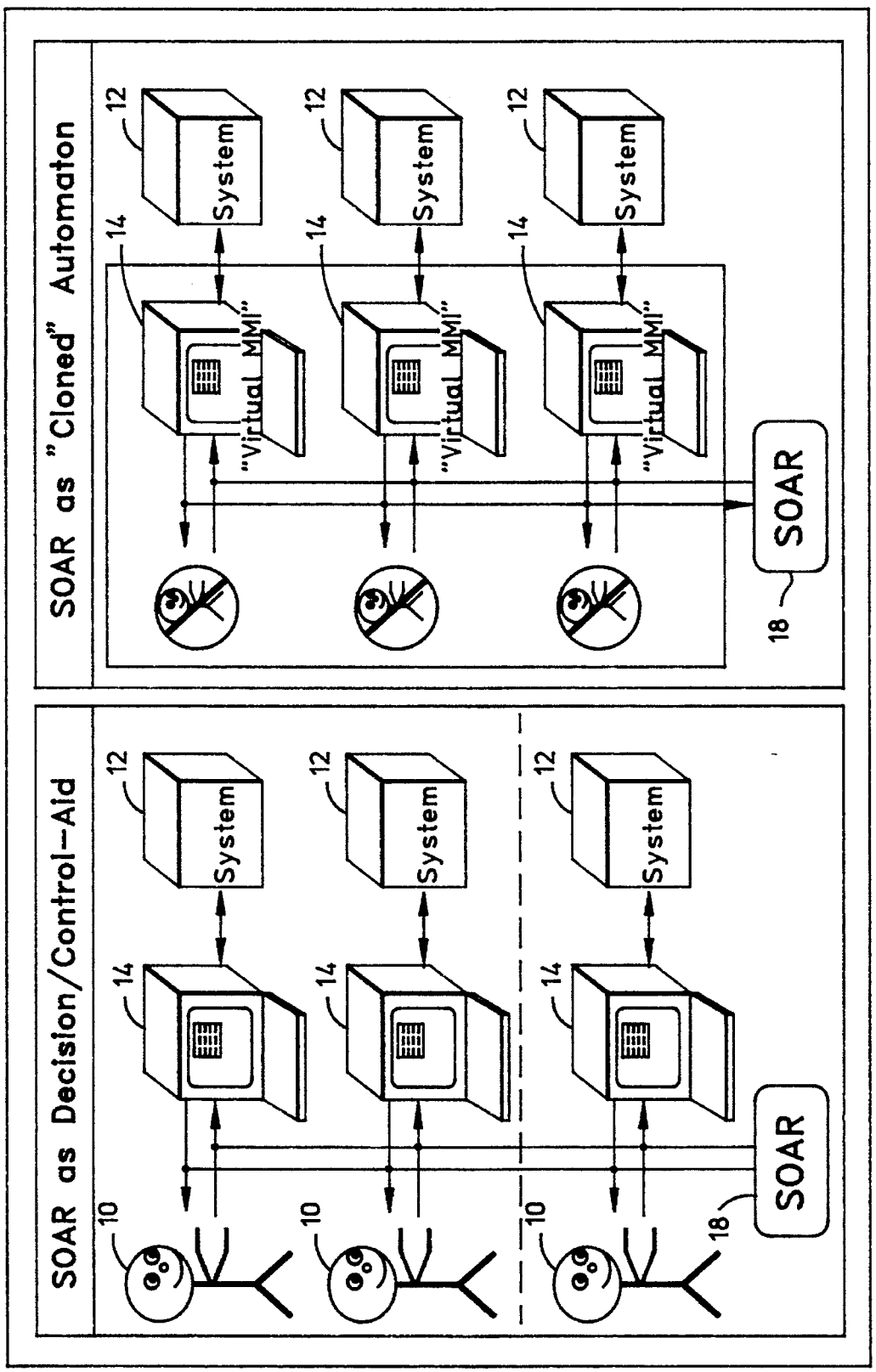

SOAR Algorithm: Parameters

TABLE I

| Name | Parameters & Variables | Potential Extensions |
|---|---|---|
| hrad | Layer12 |wk[j]-v[m,j]| distance threshold. | May be adaptive (closed-loop or open-loop). |
| hrad2 | Layer23 |w2[j]-h[m,j]| distance threshold. | May be adaptive (closed-loop or open-loop). |
| xscl | Layer12 & Layer23 weight-centroid accumulation scaler. | May be adaptive. Arbitrary accumulation scheme. |
| nfeat | Number of elements in input feature vector. | May be adaptive/variable. |
| nresp | Number of elements in output response vector. | May be adaptive/variable. |
| nclass | Number of classes in trained SOAR | May have a maximum imposed. May adaptively reduce. |
| nptr | Number of hidden nodes at any given time. | May adaptively reduce. |
| nhidden | Maximum number of hidden nodes allowed. | May be open (no max). May adaptively reduce. |
| alpha | Hidden node nonlinear transfer function parameter. | May use arbitrary nonlinear function. May use in input and output layers also. |

TABLE II

| Name | Vectors & Arrays | |
|---|---|---|
| wk[j] | Input feature vector (# of features=j) | [j=1...nfeat] |
| rk[k] | Input response vector (# of elements=k) | [k=1...nresp] |
| xn[m] | Number of instances of intermediate-class m presented at layer12 to-date[m=1...nptr] | |
| xn2[i] | Number of instances of class i presented at layer23 to-date | [i=1...nclass] |
| v[m,j] | Layer12 intermediate-class m weight vector (# weights=j) | [m=1...nptr,j=1...nfeat] |
| h[i,m] | Layer23 class i weight vector (# weights=m) | [i=1...nclass,m=1...nptr] |
| w2[m] | Output value of nonlinear hidden-node m | [m=1...nptr] |
| r[i,k] | Output response vector of class i (# of elements=k) | [i=1...nclass,k=1...nresp] |

FIG. 7

SOAR Training Algorithm: Layer12

```
                                              Initialize SOAR
                                              xn[1]=1, xn2[1]=1
                                              v[1,j]=wk[j],    [j=1...nfeat]
                                              r[1,k]=rk[k],    [k=1...nresp]
                                              h[1,m]=1/(1+exp(alpha*(-0.55)))
                                              v[1,j]=wk[j],    [j=1...nfeat]

(0) Initialize SOAR
(1) Normalize input feature vector wk[j] to [0...1]
    (arbitrary - may use any normalization [e.g.,-1...+1])
(2) flag=0; dmin=∞
TOP: For each hidden node [m=1...nptr];
     Compute distance between feature vector and wgt vector.

dist=SUM{abs(wk[j]-v[m,j])}/nfeat   (SUM over j=1...nfeat)
    May use arbitrary dist. comp.

Use dist in nonlinear transfer function computation to get hidden node output:
    w2[m]=1/(1+exp(alpha*(dist-0.5)))  ; May use arbitrary nonlinear transfer function)
    IF dist<dmin THEN           ; Check to see if current weight vector is nearest found yet:
      dmin=dist; near=m         ; If yes, save the information and check neighborhood (next step)
      IF dist<hrad THEN flag=1  ; Check if dist is within neighborhood of weight vector
                                  corresponding to intermediate-class m
    END IF
LOOP to TOP until done
Adjust weights if a weight vector is near enough, or if max # of hidden nodes have
been assigned:
    IF (flag=1) or (nptr=nhidden) THEN
      xn[near]=xn[near]+1        ; Increment # of contributors to intermediate-class "near"
      xk=xscl*(1/xn[near])       ; Compute contribution factor of feature vector
                                   (may use arbitrary weighting function)
      For all Layer12 weight vector elements [j=1...nfeat]:
         v[near,j]=((1-xk)*v[near,j])+(xk*wk[j])] ; Adjust weight-vector (intermediate-class "centroid")
    ELSE
      nptr=nptr+1,xn(nptr)=1     ; Create new hidden node & initialize # of contributors to new
                                   weight vector
      For all weight vector elements [j=1...nfeat]:
         v[nptr,j]=wk[j]         ; Create new weight-vector=feature vector
    END IF
```

FIG. 8

SOAR Training Algorithm: Layer23

```
(1) flag=0; dmin=∞
    TOP: For each output node [i=1...nclass] ; compute distance between hidden-layer output vector
         and weight vector.
         dist=SUM{abs(w2[m]-h[i,m])}/nptr  (SUM over m=1...nptr)   ; May use arbitrary dist. computation
                                                                    (and nonlinear transfer function).
         IF dist<dmin THEN                  ; Check to see if current weight vector is nearest found yet:
             dmin=dist; near=i              ; If yes, save the information and check neighborhood
                                              (next step)
         IF dist<hrad2 THEN flag=1          ; Check if dist is within neighborhood of weight vector
                                              corresponding to output-class i
         END IF
    LOOP to TOP until done (2) Adjust weights if a weight vector is near enough, or if max # of hidden nodes have been
    assigned:
    IF (flag=1) THEN
        xn2[near]=xn2[near]+1              ; Increment # of contributors to output-class "near"
        xk=xscl*(1/xn2[near])              ; Compute contribution factor of hidden-layer output vector
                                             (may use arbitrary weighting function; and different xscl than
                                             used in layer12))
        For all Layer23 weight vector elements [m=1...nptr]:
            h[near,m]={((1-xk)*h[near,m])+(xk*w2[m])}    ; Adjust weight-vector (output-class "centroid")
        For all output-class response vector elements [k=1...nrespl:
            r[near,k]={((1-xk)*r[near,k])+(xk*rk[k])}   ; Adjust output-node response-vector
                                                         (may use arbitrary weighting (e.g., none))
    ELSE  nclass=nclass+1,xn2(nclass)=1    ; Create new output-node & initialize # of contributors
                                             to new weight vector.
        For all weight vector elements [m=1...nptr]:
            h[nclass,m]=s2[m]  ; Create new weight-vector=hidden-layer output-vector
        For corresponding output-node vector elements [k=1...nrespl:
            r[nclass,k]=rk[k]  ; Create new output-node response-vector=input response vector.
    END IF
```

FIG. 9

SOAR Algorithm: Trained Processing (0) Initialize SOAR; Load weight vectors and node transfer functions.

(1) Normalize input feature vector wk[] to [0...1]; Arbitrary — may use any normalization.

(2) Layer12 Processing
TOP1: For each hidden node [m=1...nptr]; Compute distance between feature vector and weight vector.
dist = SUM{abs(wk[j]-v[m,j])}/nfeat   (SUM over j=1...nfeat); May use arbitrary dist. computation.
Use dist in nonlinear transfer function computation to get hidden node output:
w2[m]=1/(1+exp(alpha*(dist-0.5))); May use arbitrary nonlinear transfer function)
   LOOP to TOP1 until done (3) Layer23 Processing
flat=0; dmin=∞
TOP2: For each output node [i=1...nclass];Compute distance between hidden-layer output vector and weight vector.
dist=SUM{abs(w2[m]-h[i,m])}/nptr (SUM over m=1...nptr); May use arbitrary dist. computation.
IF dist<dmin THEN      ;Check to see if current weight vector is nearest found yet:
   dmin=dist; near=i   ;If yes, save the information and check neighborhood (next step)
END IF                 ;Note: May alternatively check to see if it is within neighborhood
                              (e.g., use: dist<hrad2)
   LOOP to TOP2 until done (4) Output Processing
Define SOAR output out[k] as:
For output-node vector elements [k=1...nrespl corresponding to class "near";
out[k]=r[near,k]        ;SOAR output vector=(pre-stored) output-node response-vector
                        ;Arbitrarily normalize out[k] as required for application

FIG. 10

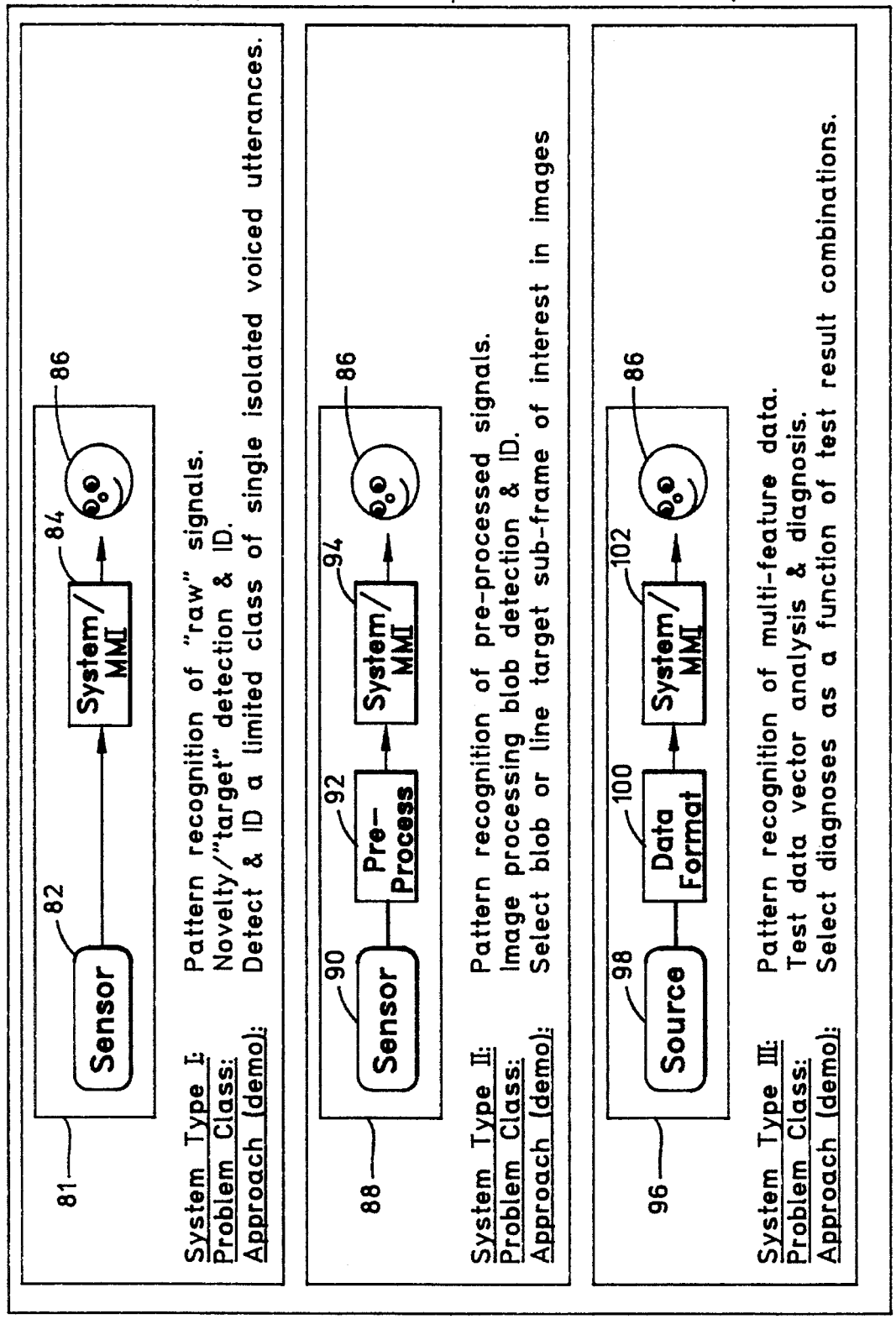

Main Demo Screen: Diagnosis Based on Test Data

| Diagnosis-Aid | Self-Organizing Adaptive Replicate (SOAR) | Loma Linda ATC |

Test Results
Test A 61
Test B 7
Test C 91
Test D 0
Test E 10

Select Diagnosis
Diagnosis 1
Diagnosis 2
Diagnosis 3
Next: Test α
Next: Test β

Test Results
Test A 61
Test B 7
Test C 91
Test D 0
Test E 10

Select Diagnosis
Diagnosis 1
Diagnosis 2
Diagnosis 3
Next: Test α
Next: Test β

> DONE <

+++ TEST ONLY +++       * RESULT * (Click mouse for next case)

TEST-MODE: (<spc> to Train/Test)    Iter: 82  Ncls: 13  Class: 11  <esc> to quit

FIG. 18

Main Demo Screen: Emergency Healthcare Allocation

| Resource-Alloc | Self-Organizing Adaptive Replicate (SOAR) | | Loma Linda ATC |

|  | Hosp A | Hosp B | Hosp C | Hosp D | Hosp E |
|---|---|---|---|---|---|
|  | 3 | 12 | 14 | 9 | 14 |
| Trauma I | 17 .68 3 | .55 0 | .99 14 | .4 0 | .21 0 |
| Trauma II | 19 .22 0 | .17 5 | .54 0 | .04 0 | .4 14 |
| Trauma III | 5 .32 0 | .57 5 | .42 0 | .04 0 | .18 0 |

Fitness: 0.61

> DONE <

|  | Hosp A | Hosp B | Hosp C | Hosp D | Hosp E |
|---|---|---|---|---|---|
|  | 3 | 12 | 14 | 9 | 14 |
| Trauma I | 17 .68 3 | .55 0 | .99 14 | .4 0 | .21 0 |
| Trauma II | 19 .22 0 | .17 3 | .54 0 | .04 0 | .4 16 |
| Trauma III | 5 .32 0 | .57 5 | .42 0 | .04 0 | .18 0 |

Fitness 0.59

--- MANUAL-TRAINING --- * RESULT * (Click mouse for next case)

TRAIN/TEST: (<spc> to Test-Only)   Iter: 103 Ncls: 32 Class: 22   <esc> to quit

*FIG. 23*

SELF ORGANIZING ADAPTIVE REPLICATE (SOAR)

BACKGROUND OF THE INVENTION

1. Technical Field

The present invention relates to information processing systems, and in particular to a system which rapidly learns to replicate observed responses to information.

2. Discussion

One goal of information processing systems research is to minimize the need for manual steps in the information processing task. While in the current state of the art many aspects of information processing are performed automatically, those stages which still rely on manually performed operations are generally seen as the weak link in the performance of the overall system.

To be specific, in information processing systems which perform such functions as signal processing, image processing, pattern recognition, process control, and resource allocation, manually performed operations result in a number of disadvantages. These include: 1) inconsistent performance, which can result from human factors such as fatigue, forgetting, etc.; 2) poor response time, which is inherent in the speed of human responses versus those of electronic systems; 3) too few "experts", which is common when the manual operation requires a person of a high level of training and skill; 4) non-robust/non-adaptive response, which typically arises from limitations in the ability of the system (or human-interface) to adapt to novel situations, changing conditions, etc.; and 5) unfriendly/interfering interaction, which results from awkward user interfaces and burdensome training procedures.

A number of approaches have been used to improve the automation of the above-discussed kinds of information processing tasks in order to avoid the many problems associated with manual steps. However, these approaches are generally unsatisfactory for various reasons. For example, direct automation is often too complex and costly to be practical. Artificial intelligence and expert system approaches are difficult to configure and result in a non-general system useful for only a narrow range of applications.

Explicit algorithms are another commonly used technical approach. These include, for example, the Simplex and Greedy algorithms, as well as fixed and heuristic algorithms. While these algorithms can operate relatively fast, they are generally computationally expensive and require considerable effort to explicitly set up the problem. Also they are not trainable and do not adapt well to variations in the data or problem structure. Conventional neural network and fuzzy logic systems are often not dependable or robust enough for many applications. Genetic algorithms are often impractical because they are usually slow and ungainly. Conventional adaptive control systems are generally non-evolutionary in that they can only adapt within a vary narrow range and cannot operate when the input/output parameters are significantly altered. Consequently, in the many settings wherein the above approaches have been employed, the systems have usually not progressed beyond the "toy" phase, and users often revert back to former manual techniques.

This reaction is not surprising since humans can generally detect subtle patterns and perform data analysis, synthesis, and fusion much better than many of the currently available automated techniques. Nevertheless, automated assistance would be highly desirable to improve performance in four main areas: 1) speed, 2) repeatability, 3) dependability, and 4) distribution of expertise.

Thus it would be desirable to provide a system which is a self-organizing adaptive replicate of human (expert) behavior. It would also be desirable to have such a system which can learn from the behavior of humans (or other systems) without requiring explicit rules and instructions, and without interfering with the behavior it is learning from. It would further be desirable to provide such a system which can be used to either assist the human in his performance of the task or, once trained, to take over the task entirely.

One approach toward a system with the above-described desired features, is a self-organizing neural network architecture known as the Adaptive Resonance Theory (ART). This approach is attractive in part due to its ability to self-organize by adding processing nodes as required. However, the ART Network is generally too complicated and computationally-intensive for many kinds of implementations. For further information regarding the ART Network see S. Grossberg, "Competitive Learning: From Interactive Activation To Adaptive Resonance", *Cognitive Science* 11:23–63 (1987). Another related neural network approach is known as the Boltzmann Machine. However, the Boltzmann Machine is not robust enough to achieve the desired goals. For further information on Boltzmann Machines see G. E. Hinton, and T. J. Sejnowski "Learning and Re-Learning in Boltzmann Machines". in *Parallel Distributed Processing* Volume 1 pp 282–317, Cambridge, Mass.: MIT Press (1986).

Another important neural network architecture is the three layer perceptron. With a non-linear hidden layer, the three layer perceptron guarantees that an arbitrary mapping of continuous spaces exists. Also, the distributed architecture of the multi-layer perceptron allows it to handle noisy or corrupted inputs and network conditions. However, the commonly used training paradigm for the three layer perceptron, known as backpropagation, suffers from a number of disadvantages. Backpropagation learning in the perceptron is generally slow. Also, it involves relatively complex calculations. Moreover, this approach does not work well for training on real-world, real-time inputs, since the training set must be specially ordered to prevent early training on one type of example to be "forgotten" by the network after subsequent training on another example. Further, the supervised training employed with backpropagation complicates the training process unduly, requiring complete retraining when only new data becomes available.

Hence, in order to achieve a system with the above-described features it would be desirable to provide a neural network type architecture which is able to add or subtract nodes as required while at the same time employing a relatively simple, easy to implement architecture that avoids complex calculations. Further, it would be desirable to provide a neural network architecture which learns (or re-learns) rapidly from a training data set which it receives from the real world in real-time, without requiring any reordering of the training data, or complete re-training.

SUMMARY OF THE INVENTION

Pursuant to the present invention an information processor is provided which, in the course of operation, becomes a self-organizing adaptive replicate (SOAR) of observed behavior. The observed behavior may be that of a human or of another automated system. The present invention can be embedded invisibly within various types of systems to observe, adapt, and grow to emulate a user's interactive behavior and performance level. The SOAR system non-intrusively self-organizes and adapts to the observed behavior yielding near-equivalent responses for near-equivalent stimuli in real-time.

In accordance with the first aspect of the present invention the SOAR system includes a neural network architecture including a plurality of input, hidden and output nodes, wherein each of these nodes receives one or more inputs and produces one or more outputs that are a function of the inputs, the hidden node outputs being a non-linear function of their inputs. A first set of weighted connections couples the input node outputs to the hidden nodes, these weighted connections comprising an input weight vector. A second set of weighted connections couple the hidden node output to the output nodes, these weights comprising a hidden node weight vector. In these two sets of connections substantially every input node is connected to every hidden node and every hidden node is connected to every output node. The system also includes a processor for computing a set of first distance vectors that are a function of the difference between each input weight vector and an input feature vector comprising the inputs to the input nodes. These first distance vectors are fed to the hidden nodes as inputs. Also the system includes a processor for computing a set of second distance vectors that are a function of the difference between each hidden node weight vector and a vector comprising the outputs of the hidden nodes. The smallest of the second distance vectors is then determined and an output node associated with the smallest distance vector generates an output. In this way, for each unique input feature vector, one output node will generate a response. In the preferred embodiment, each output node vector generates an output comprising a predetermined output response vector. This output response vector is acquired, or learned, from observing the behavior of a separate system responding to the input vector. Also, in the preferred embodiment the system adds new hidden nodes and/or output nodes when certain conditions are met.

In accordance with the second aspect of the present invention a method of processing information is provided in which incorporates the techniques of the system of the first aspect of the present invention.

The SOAR system is continually adaptive and re-trainable for arbitrary feature and classification spaces. It is also continuously self-organizing and scaleable, growing and shrinking to accommodate the necessary classification space. It converges rapidly and can generalize after being given limited numbers of examples. The SOAR system operates at high speed, and is amenable to parallelization, yielding results which are repeatable and dependable. It is easily replicated for distribution of expertise. Also it is simple to set up, initiate, and control. The SOAR system is non-intrusive when embedded in another system and can co-exist "invisibly" within the system. It is compact and low cost and easily evoked or removed by a user and its results are testable and validatable.

BRIEF DESCRIPTION OF THE DRAWINGS

The various advantages of the present invention will become apparent to one skilled in the art by reading the following specification and by reference to the following drawings in which:

FIG. 1A is a diagram of a conventional trained decision aid technique employing active training.

FIG. 1B is a diagram of the SOAR system of the present invention employing passive training.

FIG. 1C is a diagram of the SOAR system of the present invention undergoing passive training.

FIG. 3A is a diagram showing the SOAR system employed as a decision/control aid;

FIG. 3B is a diagram showing the SOAR system employed as a cloned automaton;

FIG. 7 is a table defining nomenclature for parameters, variables, and vectors employed in the SOAR training procedure in accordance with the preferred embodiment of the present invention;

FIG. 8 is a pseudo-code program used for training layer 1–2 in the SOAR architecture in accordance with a preferred embodiment of the present invention;

FIG. 9 is a pseudo-code program for training the SOAR architecture layers 2–3 in accordance with a preferred embodiment of the present invention;

FIG. 10 is a pseudo-code program used to simulate the processing of the SOAR architecture once training is complete in accordance with a preferred embodiment of the present invention;

FIGS. 11A–C depict processes employed in system Types 1, 2 and 3 for three different classes of problems;

FIG. 18 is a diagram of test results and a resulting diagnosis performed in the pattern recognition problem addressed by the Type 3 system in FIG. 17;

FIG. 23 is an example of the results of emergency health care allocation performed by the SOAR in FIG. 22.

DESCRIPTION OF THE PREFERRED EMBODIMENTS

Figure 2B:
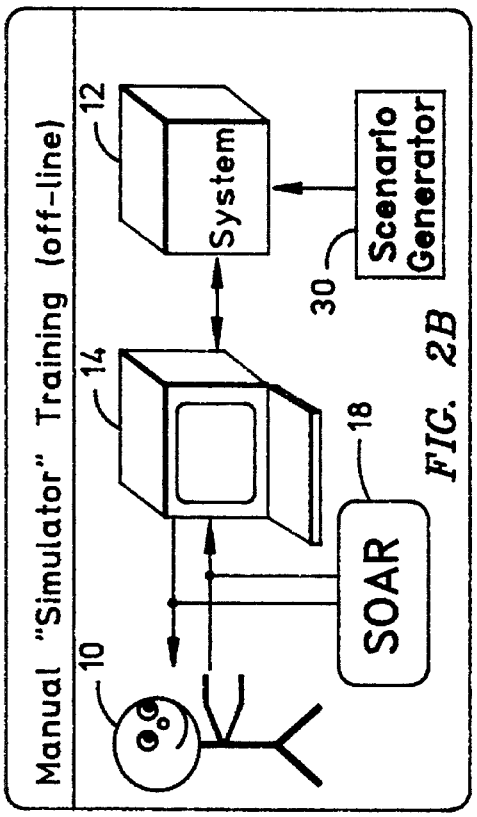
FIG. 2B is a diagram of an off-line training procedure for the SOAR system in accordance with the present invention.

The present invention is a self-organizing adaptive replicate (SOAR) system which employs a unique neural network type architecture and training process. The SOAR has a number of attributes which allows it to be employed in numerous applications to operate unsupervised and unassisted in the background, while rapidly learning to replicate observed behavior.

The SOAR is a general purpose system that can be adapted to many kinds of applications. It can be trained in real-time, while the behavior to be learned is occurring, off-line via an "expert", or off-line via an explicit algorithm.

Referring now to FIGS. 1A–C, there is shown one manner of using SOAR as compared to conventional decision aids. In FIG. 1A the first of a two step approach used in conventional decision aid techniques is shown. A user 10 interacts with a system 12 and a conventional decision aid 14 is coupled between the two. The input/output relationships employed by the user in the given application are actively and explicitly trained into the decision aid. The training may take place either off-line or on-line. In step 2, shown in FIG. 2B the conventional decision aid 14 is now trained and is coupled to the system in a manner such that when the user 10 interacts with the system 12 by means of a user interface 16 the conventional decision aid 14 may be evoked by the user. For example the decision aid 14 may provide a confirmation of a decision to be made by the user 10.

In contrast, as shown in FIG. 1C the SOAR system 18 is passively trained on-line (although off-line training may be used also). In this case, the user 10 interfaces with the system 12 by means of a user interface 14 in the normal manner used to perform the specific task. Without interfering with this process, the SOAR 18 is coupled between the user 10 and the user interface 14 and passively observes and eventually learns to replicate the user's behavior. That is, given a particular input signal or pattern 20, the user responds with an output response 22. These input and output relationships are fed to the SOAR 18 along lines 24 and 26 respectively as training input. Once the SOAR 18 is trained it may be evoked explicitly as a continuously adaptive decision aid for the user. For example, it may be used merely to confirm a decision already reached by the user. Alternatively, it may be used to assist the user in arriving at a decision. At one extreme, the trained SOAR 18 may even be employed to replace the user entirely for appropriate applications.

Figure 2A:
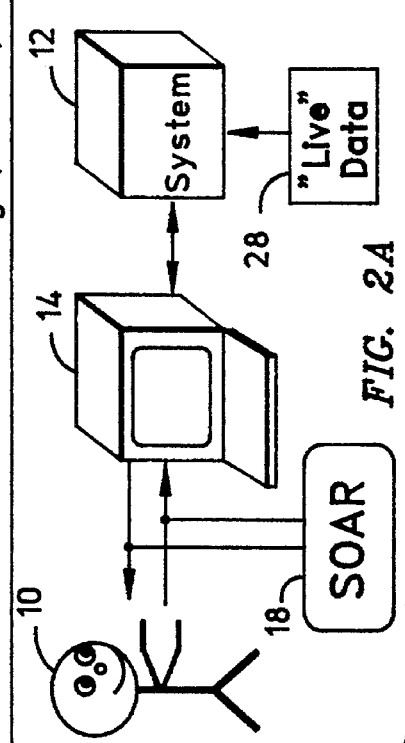
FIG. 2A is a diagram of an on-line training procedure for the SOAR system of the present invention.
Figure 2C:
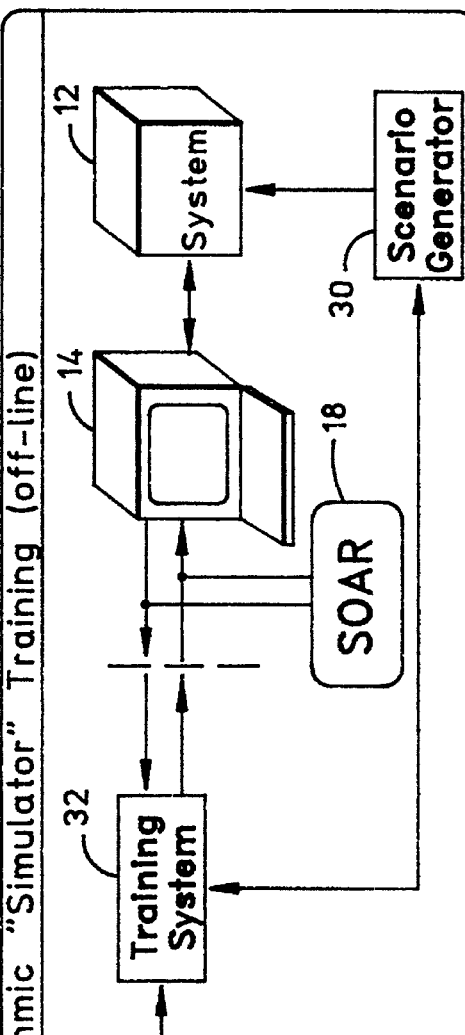
FIG. 2C is a diagram of an off-line training procedure employing automatic/algorithmic "simulator" training for the SOAR system in accordance with the present invention.

Three possible modes of training the SOAR 18 are illustrated in FIGS. 2A–C. In FIG. 2A the SOAR 18 is trained "live" on-line. That is, the user 10 interacts with the system 12 by means of the user interface 14 which receives live data 28. For example, this technique may be employed to train the SOAR 18 while the user 10 is actually performing a function on real-world data in real-time. In FIG. 2B, off-line training utilizing simulated data is shown. Here, the user 10 interacts with the system 12 through the user interface 14 in response to simulated data presented to the system 12 by a scenario generator 30. This enables a wide range of scenarios to be covered.

A third mode of training the SOAR system 18 is shown in FIG. 2C. Training in this configuration is performed off-line in a manner similar to that of FIG. 2B except that the human user 10 has been replaced by a training system 32. The scenario generator 30, user interface 14, and system 12 may be similar to those described in FIG. 2B. The training system 32 provides a dual function, first it provides a control function for the scenario generator 30; also it acts as a user 10 by producing particular output responses in response to a given input from the system 12. The training system 32 may comprise one of a variety of conventional or non-conventional processing systems including but not limited to the following: Pattern Recognition; Genetic Algorithm: Simulated Annealing; Artificial Neural Network; Simplex/Greedy; AI/Expert System; Fuzzy System; or Fixed/Heuristic Algorithm. Utilizing the system of FIG. 2C the SOAR 18 can be trained to produce an output that is comparable to that produced by the training system 32. However, once trained, the SOAR 18 has the advantage in that it can produce this output without many of the disadvantages of the training systems algorithm. For example, the SOAR 18 may be trained to replicate the performance of the Simplex or Greedy Algorithms for a given application without performing the extensive computations required by these algorithms. Further, the SOAR has an additional advantage over many of the typical algorithms described above in that it will better tolerate inputs that are noisy, degraded, or ambiguous.

Additional advantages of the SOAR system can be seen in the diagrams in FIGS. 3A and B. In FIG. 3A a single SOAR system 18 is connected to a plurality of distributed processing systems each comprising a user interface 14 and system 12 as described above in connection with FIG. 1C. The SOAR 18 is then trained in the same manner as depicted in FIG. 1C, and once trained, can be used as a decision and/or control aid by the user. For example, before giving an actual response, the user 10 may check to see what response the SOAR will give for a particular input. Thus, the SOAR may serve as a confirmation to improve confidence in the decision by the user 10 when the SOAR's response agrees with the user 10. Also, when the SOAR 18 produces a different response, the user 10 may use this result to double check his own decision to determine if a mistake has been made.

In FIG. 3B a the SOAR 18 is being utilizes as a "cloned" automaton. Here, a trained SOAR 18 is connected to a plurality of user interfaces 14 to control responses to a plurality of systems 12. In this configuration, the SOAR 18 replaces the user to provide completely automated responses.

In order for the SOAR to operate in the manner described in FIGS. 1–3, the SOAR employs a neural network type architecture with a number of unique characteristics. These characteristics enable a SOAR to handle a wide variety of input vectors, and also to produce appropriate output vectors which mimic those of the user or trainer. In particular, the SOAR must be capable of being trained in an un-supervised manner, must be able to handle input feature vectors of various sizes, must be able to map these input vectors onto an arbitrary classification space, and must also produce an output response vector which is a replicate of the user/trainer response.

Figure 4:
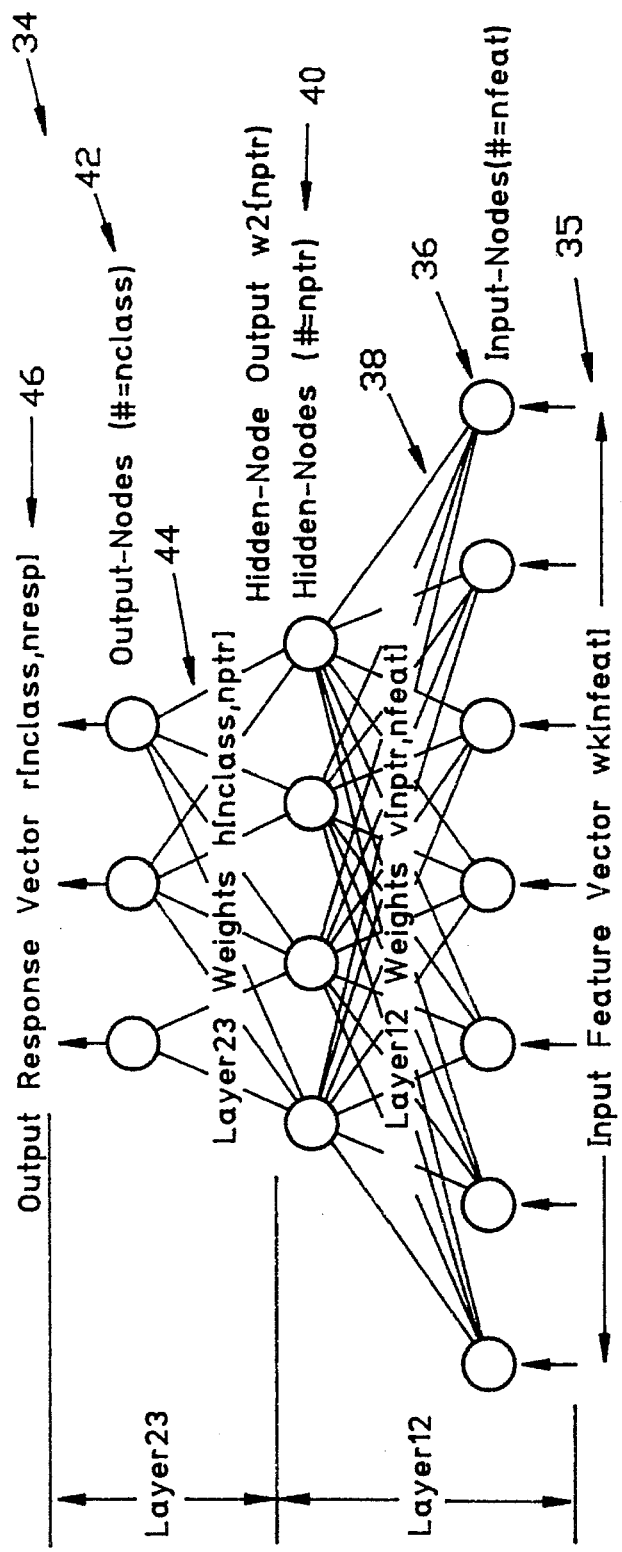
FIG. 4 is a diagram of the SOAR architecture in accordance with a preferred embodiment of the present invention.

In accordance with a preferred embodiment, the SOAR utilized an architecture such as that shown in FIG. 4. The SOAR architecture 34 is a multi-layer perceptron type architecture which has a number of features (described below) that make it particularly well suited to the above-discussed SOAR applications. The SOAR architecture 34 includes a set of input nodes 36 in the input node layer, a set of layer 1–2 weights (weighted connections) 38 and a hidden node layer comprising a set of hidden nodes 40. An output node layer includes a set of output nodes 42 connected to the hidden nodes 40 by means of a set of weighted connections referred to as the layer 2–3 weights 44.

In general, the SOAR architecture 34 can be summarized by the five following characteristics: 1) each layer is fully connected to the layer above, 2) the input node layer receives an arbitrary length input feature vector 35, which the input nodes produce as an output. This output is arithmetically compared to the layer 1–2 weight set 38 that is connected to a given node 40 in the hidden layer; this yields a distance result, 3) the distance result is passes through the hidden layer node 40 non-linear transfer function to produce a hidden node output, 4) the hidden layer node output is arithmetically compared to the layer 2–3 weight set, which is connected to a given node 42 in the output node layer, to yield a second distance result, 5) the second distance result is passed through the output nodes 42 and the output node yielding the smallest distance is used to select an appropriate response vector. A key difference between the SOAR architecture 34 and conventional backpropagation (discussed above) is that the weight values themselves are compared to input values to produce a distance vector; in backpropagation, the weight values are multiplied by each input value and summed by the receiving node.

Figure 5:
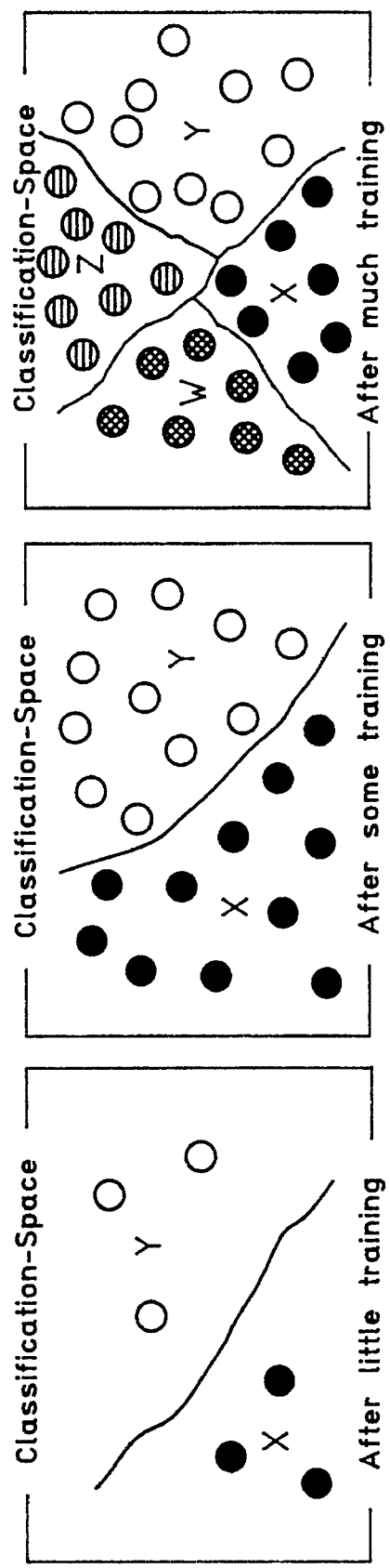
FIG. 5 is a diagram depicting three stages of classification space during successive training of the SOAR system of the present invention.

FIG. 5 is a diagram of the self-organizing division of classification space by the SOAR into classes after three stages of training. In more detail, the first drawing in FIG. 5 indicates that the SOAR has divided classification space into two regions, labeled x and y. In the second drawing, after additional training, the two regions are better defined with more training examples. In the third view, after still further training, the classification space has been divided into four regions w, x, y and z.

Figure 6:
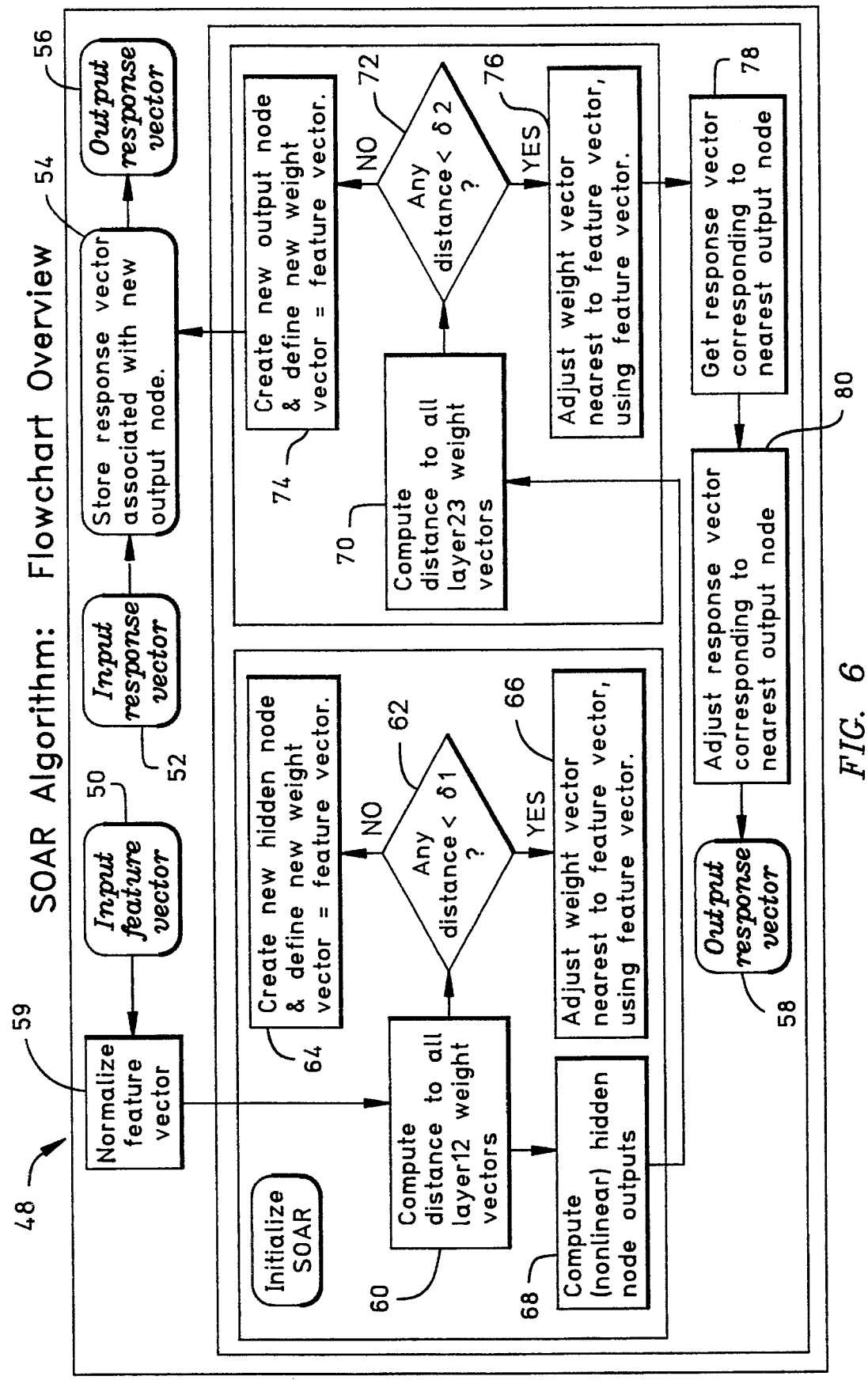
FIG. 6 is a flow chart showing an overview of the processes employed by the SOAR system of the present invention.

Referring now to FIG. 6 a flow chart 48 of the overall processing of the SOAR 34 to achieve the performance shown in FIG. 5 is illustrated. Flow chart 48 begins with two inputs, the input feature vector 50 and the input response vector 52. The input feature vector 50 corresponds to the user 10 input 20 as well as the SOAR input 24 shown in FIG. 1C. The input response vector 52 corresponds to the user's response 22 which is also transmitted to the SOAR along line 26 in FIG. 1C. The input response vector is stored in block 54 and will be used to generate output response vectors 56 and 58 as explained in more detail below.

The input feature vector 50 is first normalized 59. This normalization process may involve scaling and may comprise a fixed or adaptive process to insure that input feature vectors are of the appropriate size for the SOAR. Also this insures that different input feature vectors from different domains are normalized so that they will be processed by the SOAR in a similar manner allowing the range of these different vectors to impact the SOAR equally.

Next the SOAR is initialized. This is accomplished by first computing the distance to all of the weight vectors in step 60. That is, for each hidden node 40, the input node 36 layer output is arithmetically compared to the weight set 38 connected to that hidden node 40. It is then determined whether any of these distance vectors are less than a first predetermined threshold δ1 in decision diamond 62. If not, the system 48 will create a new hidden node 40 and define a new weight vector for that hidden node which is equal to the input feature vector 35 in step 64.

If there are distance vectors less than δ1, then step 66 determines the weight vector which is nearest to the feature vector and adjusts that weight vector to be closer to the feature vector. Also, in step 68, the system computes the (non-linear) hidden node outputs.

Next in step 70 (similar to step 60), the distance to all of the weight vectors is computed. That is, the difference vector between the weight vector feeding each output node 42 and the inputs to that output node from the hidden layer nodes is computed. It is then determined in decision diamond 72 whether any of these distance vectors are less than a second predetermined threshold, δ2. If not, in step 74 a new output node is created and a new weight vector is defined which is equal to the hidden node output. Next, in step 56 the response vector 46 associated with that input feature vector (stored in step 54), is produced as an output response vector, this time, and every time that new output node is activated.

If instead, decision diamond 72 determined that there were distances less than the δ2, then in step 76 the weight vector associated with that output node having the smallest distance is adjusted to be even closer to the hidden node output. Next, in step 78 the response vector corresponding to the nearest output node is retrieved and adjusted in step 80 to be closer to the output response vector associated with the current input feature vector. The resulting output response vector is then generated as output in step 58.

The SOAR process 48 described in connection with FIG. 6 will now be discussed in more detail as implemented in a preferred embodiment of the invention. Referring now to FIG. 7, a list of SOAR process parameters is provided. The software notation for parameters and variables are provided in Table I and vector arrays are provided in Table II a second table in FIG. 7. In a preferred embodiment, hrad and hrad2 may typically be set between 0.01 and 0.25 or greater; alpha may be set to −3.0; xsc1 may be 0.9; and n hidden may be between 5 and 10 or greater. Experiment shows that, as anticipated, smaller values of hrad and hrad2 yield more classes, and that their values are appropriately proportioned to nfeat and the anticipated number of classes.

Referring now to FIGS. 8 and 9, a written pseudo code for the SOAR training process is shown. The training process for layer 1–2 is illustrated in FIG. 8, and the training process for layer 2–3 is illustrated in FIG. 9. Referring now to FIG. 8, the initialization process is shown in the "Initialize SOAR" routine. In this routine, xn[1], which represents the number of instances of intermediate/class m presented to layer 1–2 to-date (where m equals 1 . . . nptr (the number of hidden nodes at any given time)), is set to 1. Likewise, xn2[1] is set to 1, where xn2[i] is equal to the number of instances of class i being presented to layer 2–3 to-date (where i equals 1 . . . nclass (the number of classes in the trained SOAR)). V[m,j], which is the layer 1–2 intermediate/class m weight vector for the case m=1, is set equal to wk[j], the input feature vector. The output response vector of class i,r[i,k] for the case i=1 is set equal to rk[k], the input response vector, where k=1 . . . nresp. H[i,m], the layer 2–3 class i weight vector for the case i=1 is set to be equal to 1/(1+exp(alpha*(−0.5))). Alpha is an arbitrary hidden node non-linear transfer function parameter. It will be appreciated that other hidden node non-linear transfer functions may also be employed.

In step 1, the input feature vector wk[j] is normalized to [0 . . . 1]. This normalization is arbitrary and other normalization may also be used, for example, the range −1 . . . +1. In step 2 the flag (described below) is set to 0, and dmin (the minimum distance) is set to a very large initial value. For each hidden node [m=1 . . . nptr] the distance between the input feature vector and the weight vector is computed as follows: dist=SUM{abs(wk[j]−v[m,j])}/nfeat. This sum is computed over j=1 . . . nfeat. It will be appreciated that other distance computations may also be employed.

The distance result dist is then used in a non-linear transfer function computation to get hidden node outputs as follows: w2[m]=1/(1+exp(alpha*[dist−0.5])). It will be appreciated that other non-linear transfer functions may also be used. In the next step there is a check to see if the current weight vector is the nearest one found yet. If yes, this information is saved and a check is performed to see if dist is within the neighborhood of the weight vector corresponding to intermediate class m, if so then flag is set to equal to 1. The process then loops back to "Top" and repeats itself until all the hidden nodes have been processed.

In step 3, weights are adjusted if a weight vector is near enough, (flag=1) or if the maximum allowable number of hidden nodes have been assigned (nptr=n hidden). To adjust weights, first the number of contributors to the intermediate-class "near" is incremented by 1. Next, a contribution factor (xk) of the feature vector is computed as xsc1*(1/xn[near]). Other weighing functions may also be used depending on the application and desired influence. Next, for all the layer 1–2 weight vector elements, the weights are adjusted to bring the weight vector closer to the intermediate-class "centroid" using the following equation: v[near,j]={((1−xk)*v[near,j])+(xk*wk[j])}

On the other hand if none of the weight vectors are near enough, and if the maximum allowable number of hidden nodes have not been assigned, then anew hidden node is created and the number of contributors to the new weight vector is initialized. That is, nptr=nptr+1, and xn(nptr)=1. Also a new weight vector for the new hidden node is created which is identical to the feature vector. This completes the layer 1–2 processing of a single input feature vector.

Referring now to FIG. 9 the SOAR training process for layer 2–3 is shown. In step 1 the flag is initialized to be 0 and dmin is set to a very large initial value. In the TOP routine first the distance between the hidden layer output vector and the weight vector is computed for each output node as dist=SUM{abs(w2[m]−h[i,m])}/nptr. Next a check is performed to see if the current weight vector is the nearest one found yet. If it is dmin is set equal to dist, and near is set equal to i. Next a check is performed to see if dist is within the neighborhood of the weight vector corresponding to the output class i. If it is, then the flag is set equal to 1. The process then loops back to TOP and repeats itself until all the output nodes have been processed.

In step 2 the weights are adjusted if a weight vector is near enough (flag=1). It will be appreciated that a maximum number of output nodes may also be imposed here, as appropriate to the specific application. Thus, if the flag is set equal to 1 then first the process increments the number of contributors to the output class xn2[near] by 1. Next the contribution factor of the hidden-layer output vector is computed as xk=xsc1*(1−xn2[near]). Of course other arbitrary weighing functions may be used. Also a different xscl may be used than the one in layer 1–2. For all layer 2–3 weight vector elements the weight-vector is then adjusted to move it toward the output-class "centroid" using the following equation: h[near,m]={((1−xk)*h[near,m]+(xk*w2[m])}. For all output-class response vector elements the output node response-vector is adjusted as follows: r[near,k]={((1−xk)*r[near,k])+(xk*rk[k])}. If the flag is not set equal to 1 then a new output node is created and the number of contributors to the new weight vector are initialized. For all weight vector elements a new weight vector, defined as being equal to the hidden-layer output-vector, is created: h[nclass,m]=w2[m]. For corresponding output-node vector elements a new output node response vector equal to the input response vector is created. Thus r[nclass,k]=rk[k].

In FIG. 10 the SOAR process for the trained system is shown. First, the SOAR is initialized by loading the weight vectors and node transfer functions. In step 2 the input feature vector wk[j] is normalized, for example to be between 0 and 1. In step 2 layer 1–2 processing is performed in the routine designated TOP1. First, for each hidden node the distance between the feature vector and the weight vector is computed in the manner described above. Next the derived dist value is used in the non-linear transfer function computation to get the hidden node output. This subroutine is repeated until each hidden node is processed.

In step 3 the layer 2–3 processing is performed. The flag is initially set to 0 and dmin is set to a very large value. In the TOP2 routine, for each output node the distance between the hidden layer output vector and the weight vector is computed in the manner described above. A check is then performed to see if the current weight vector is the nearest one found yet. If it is dmin is set equal to dist and near is set equal to i. This routine is repeated for each output node. Alternatively, a check may be performed to see if dist is within the neighborhood, dist<hrad2. In step 4 output processing is performed where the SOAR output out[k] is defined for output-node vector elements corresponding to class "near": the SOAR output vector is equal to the pre-stored output node response vector. That is, out[k]=r[near,k]. Out[k] may be arbitrarily normalized as required for the application.

To illustrate the wide variety of uses for the SOAR system, its applications in five illustrative types of systems will be described. In FIG. 11 the first three types of systems are illustrated. In Type 1 system pattern recognition is performed on "raw" signals. In this type of system 81, a sensor 82 receives the raw signals and the target identification system/man-machine interface (MMI) 84 performs target detection and identification on the sensor output. The system 84 then produces an output which identifies the pattern to a user 86. An example of a Type 1 system to be described below is the detection and identification of a limited class of single isolated voiced utterances.

In the Type 2 system pattern recognition is performed on pre-processed signals. In this system 88 a sensor 90 produces an output which is processed by a pre-processor 92 and the processing system 94 then detects and identifies a pattern for the user 86. The Type 2 problem to be discussed below is the problem of selecting a blob or line target subframe of interest in an image.

In the Type 3 system 96 pattern recognition of multi-feature data is performed. A source of data 98 produces multi-feature data which is formatted by a data format unit 100. The processing system 102 then performs test data vector analysis and diagnosis to produce an output for the user 86. In the example below, the SOAR system is applied to a Type 3 system which selects a medical diagnosis as a function of test result combinations.

Figures 12A, 12B:
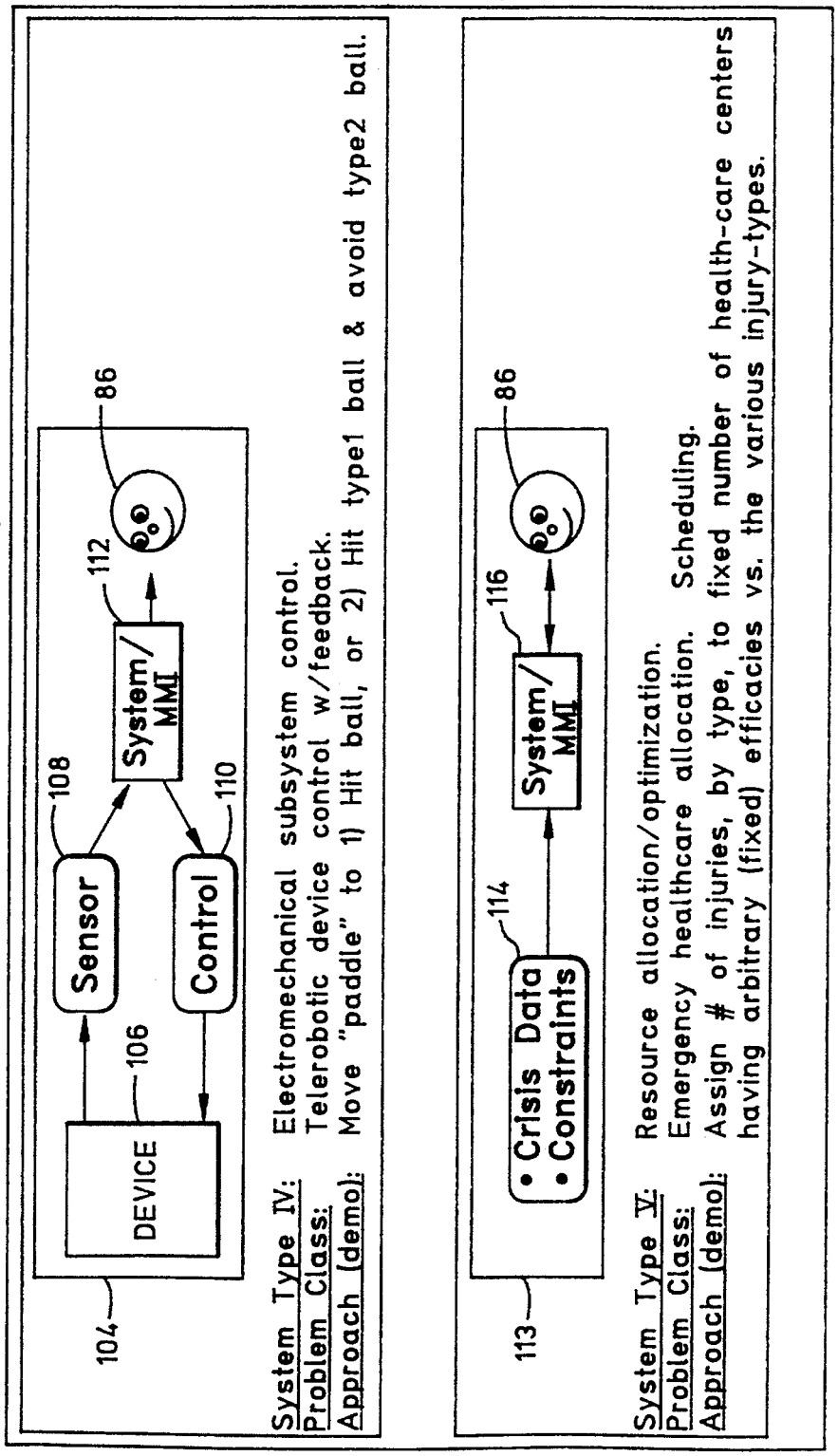
FIGS. 12A–B depict processes employed in system Types 4 and 5 for two different classes of problems.

Referring now to FIG. 12, the Type 4 system 104 comprises an electro-mechanical subsystem control. An electro-mechanical subsystem device 106 is connected to a sensor 108 and a control unit 110. The system 112 receives the sensor output, processes them in interactive manner with the user 86 to generate outputs for the control unit 110 to control the electro-mechanical subsystem 106. In the discussion below, the SOAR system is applied to a Type 4 system involving a paddle ball game.

The Type 5 system 113 is a resource allocation/optimization system. Utilizing a data base 114 containing the crisis data and the constraints, the Type 5 system 116 generates an appropriate response which optimizes resource allocation in an interactive manner with the user 86. An example Type 5 problem is emergency health care allocation and scheduling. In the discussion below, the SOAR system will be applied to the problem of assigning patients having various categories of injuries to a fixed number of health care centers having arbitrary efficacious for various injury types.

Figure 13:
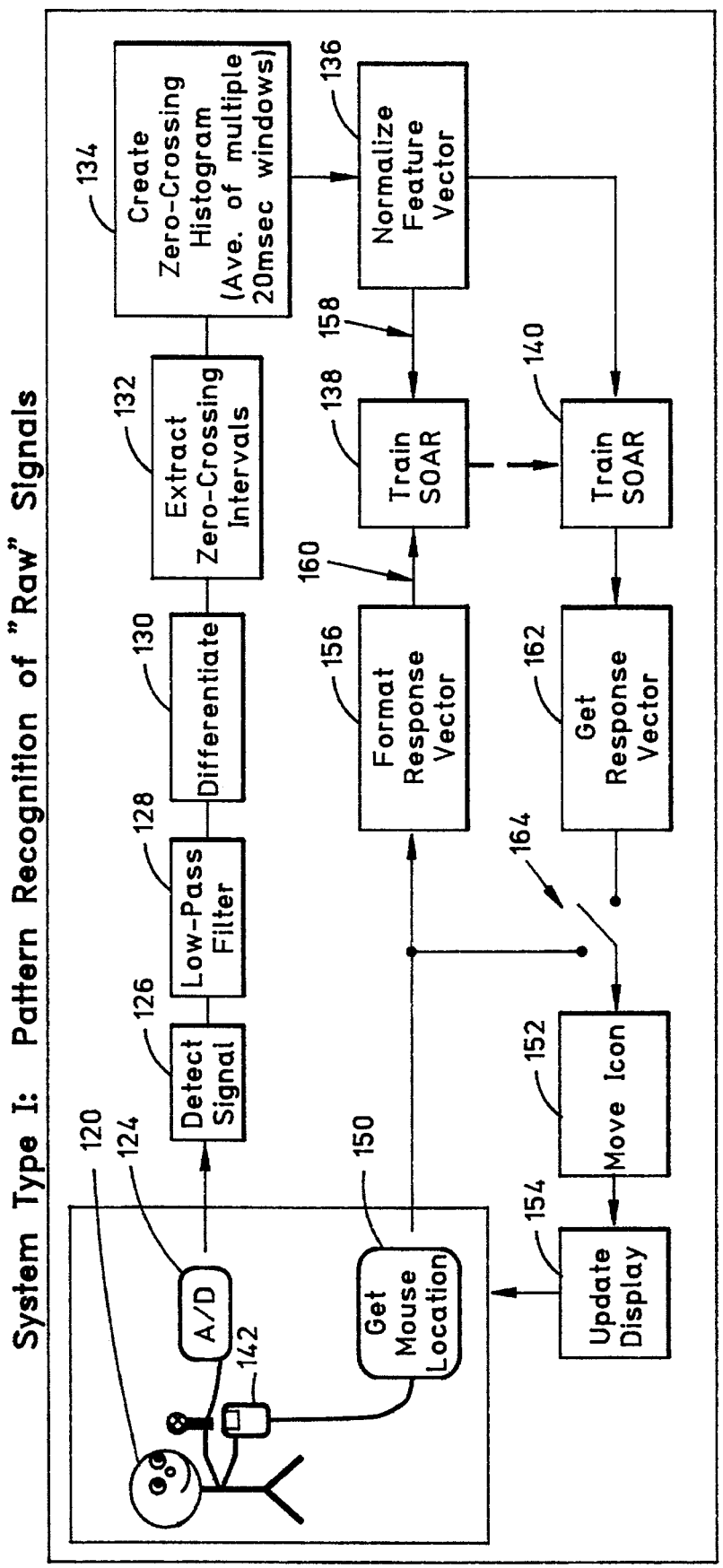
FIG. 13 is a diagram of a Type 1 system employing a SOAR to recognize patterns of raw signals.

The application of the SOAR to the Type 1 system is illustrated in FIG. 13. In this Type 1 system 118 the pattern recognition of raw signals is demonstrated. These signals may comprise, for example, medical signals (EEG, EMG, etc.) radar, sonar, speech signals, etc. In the speech processing example shown in FIG. 13, the system detects and identifies a limited class of single isolated voiced utterances. The voice signals from a user 120 are received by a microphone 122 digitized by an 8 bit analog to digital converter 124 and detected by a signal detector 126. The signal vector unit 126 samples at a 12 khz rate. A low pass filter 128 (Butterworth filter, fc=3000 $H_z$) is then applied to the signal and a differentiation process 130 is applied in order to baseline the signal and enhance higher frequency components. Zero crossing intervals are then extracted 132 which are used to created a zero crossing histogram feature vector 134 which is the average of multiple 20 millisecond windows. This feature vector is then normalized 136 and used to train the SOAR 138 and also to test the SOAR 140.

Figure 14:
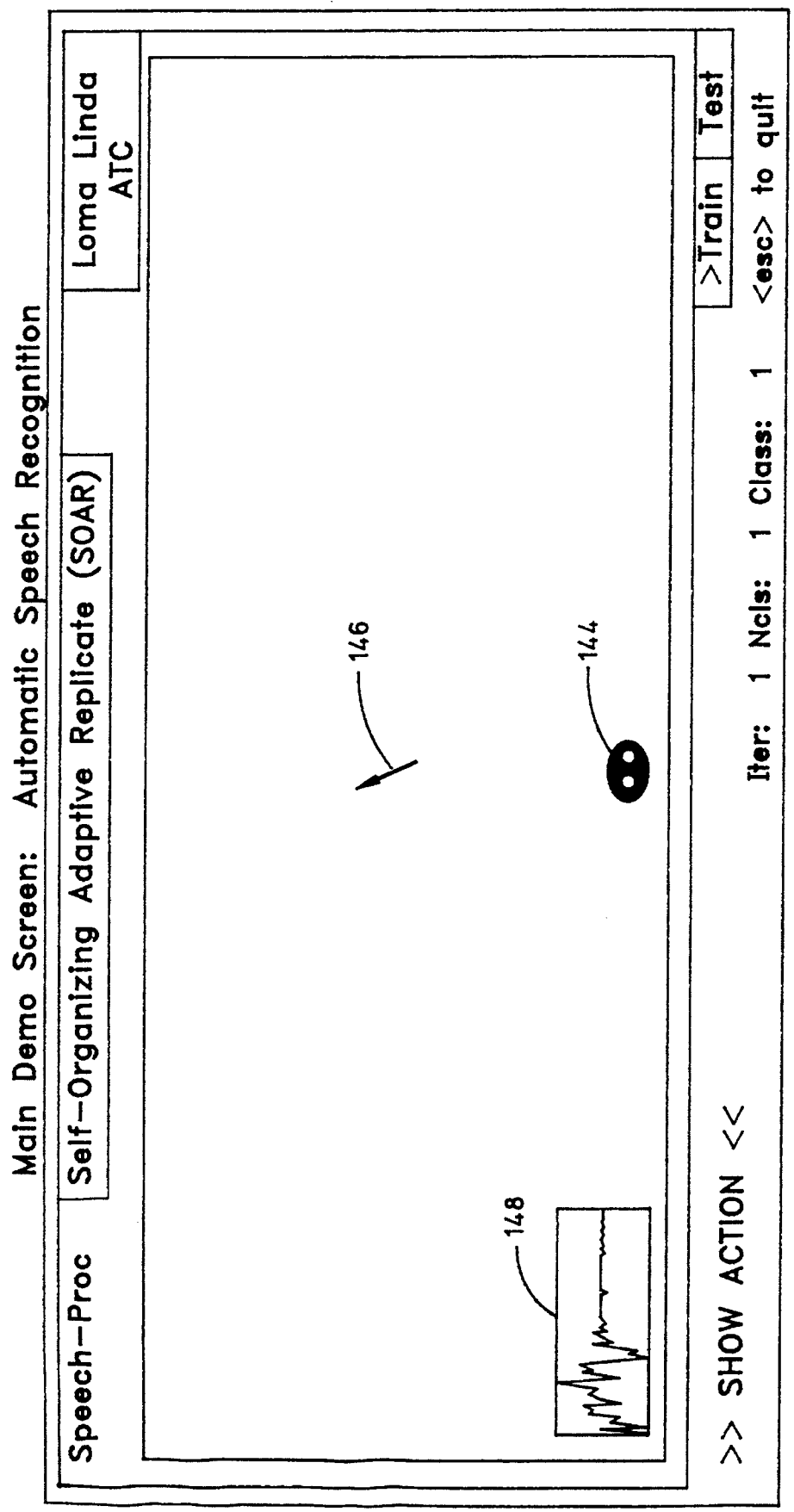
FIG. 14 is a display screen employed in a demonstration of automatic speech recognition utilizing the SOAR in a Type 1 system shown in FIG. 13.

In this particular application, the user 120, after uttering a word, uses a mouse 142 to move an icon 144 shown in FIG. 14 in a direction indicated by the spoken word. For example, if the word spoken is "up", the icon 144 is move dup to the position of the arrow 146 in FIG. 14. FIG. 14 also shows a waveform 148 of the raw signal of the spoken word. In order to accomplish this, the mouse location is determined in block 150, and the icon 144 on the display is moved in block 152 and the display updated in block 154. To train the SOAR, the response vector comprising the mouse response by the user following the spoken word is formatted in block 156. The "raw signal" input 158 and the formatted response vector 160 both comprise the training input for SOAR.

Once trained, the SOAR can be tested by uttering the word used to train it, and determining the response vector 162 produced in response to that spoken word. Using switch 164, this response vector can then be transmitted to the move icon 152 and update display 154 units to cause the icon 144 to move in the manner requested. Thus trained, the SOAR will be able to move the icon 144 up in response to the spoken word "up" and down in response to the word "down", left in response to the command "left", and right in response to the command "right", etc.

Figure 15:
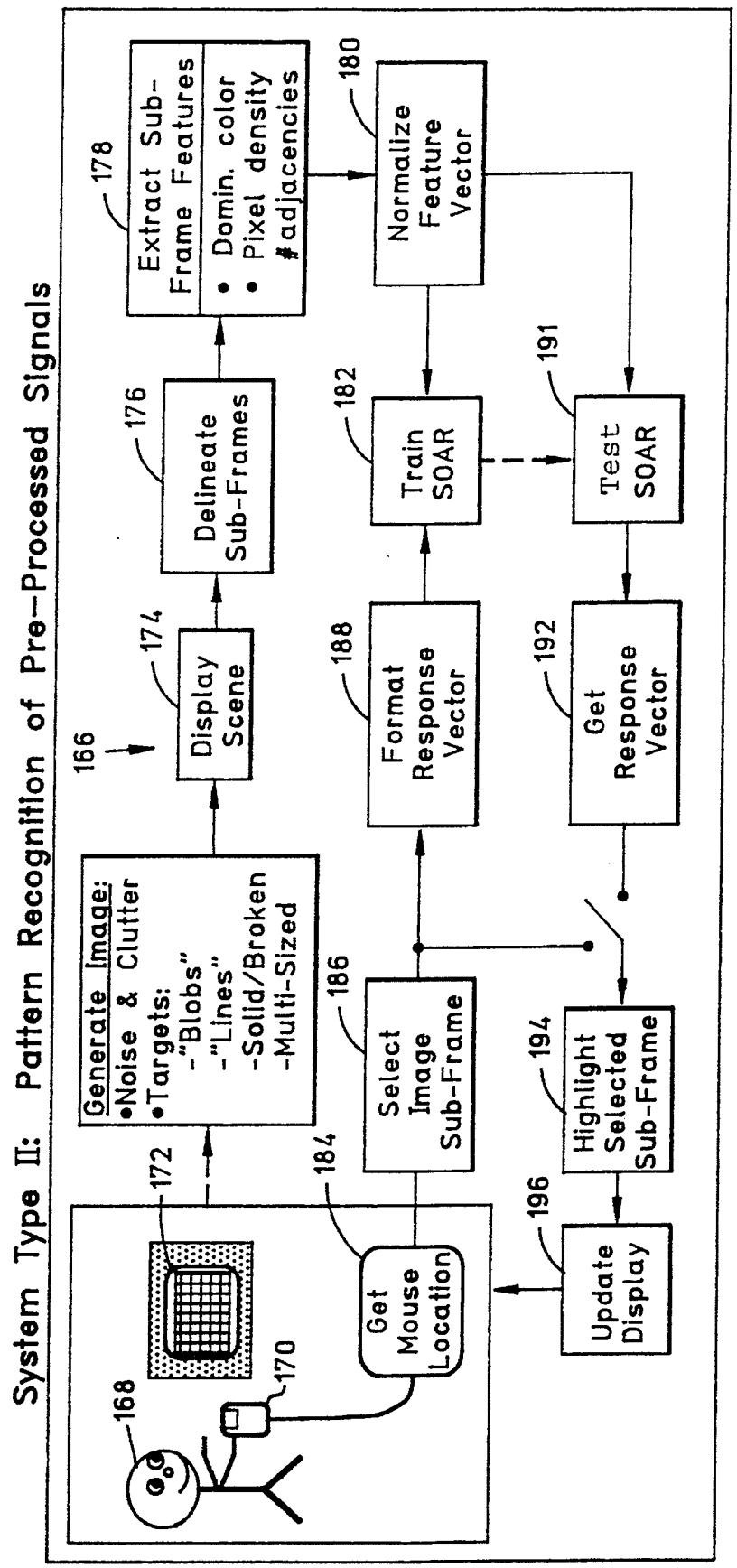
FIG. 15 is a diagram of a Type 2 system employing a SOAR to recognize patterns of pre-processed signals.

In the Type 2 system 166, illustrated on FIG. 15, the SOAR demonstrates pattern recognition of pre-processed signals. In general, the user 168 moves a mouse 170 to select a blob or line target subframe of interest in an image 172. The image will contain noise and clutter, and the target may consist of blobs, lines, solid/broken lines and blobs and multi-sized lines and blobs. The scene is displayed 174 and subframes are delineated in step 176. Subframe features are extracted 178 including features such as dominant color, pixel density, and number of adjacencies. The feature vector thereby produced is normalized 180 and transmitted to the SOAR 182.

Figures 16A, 16B:
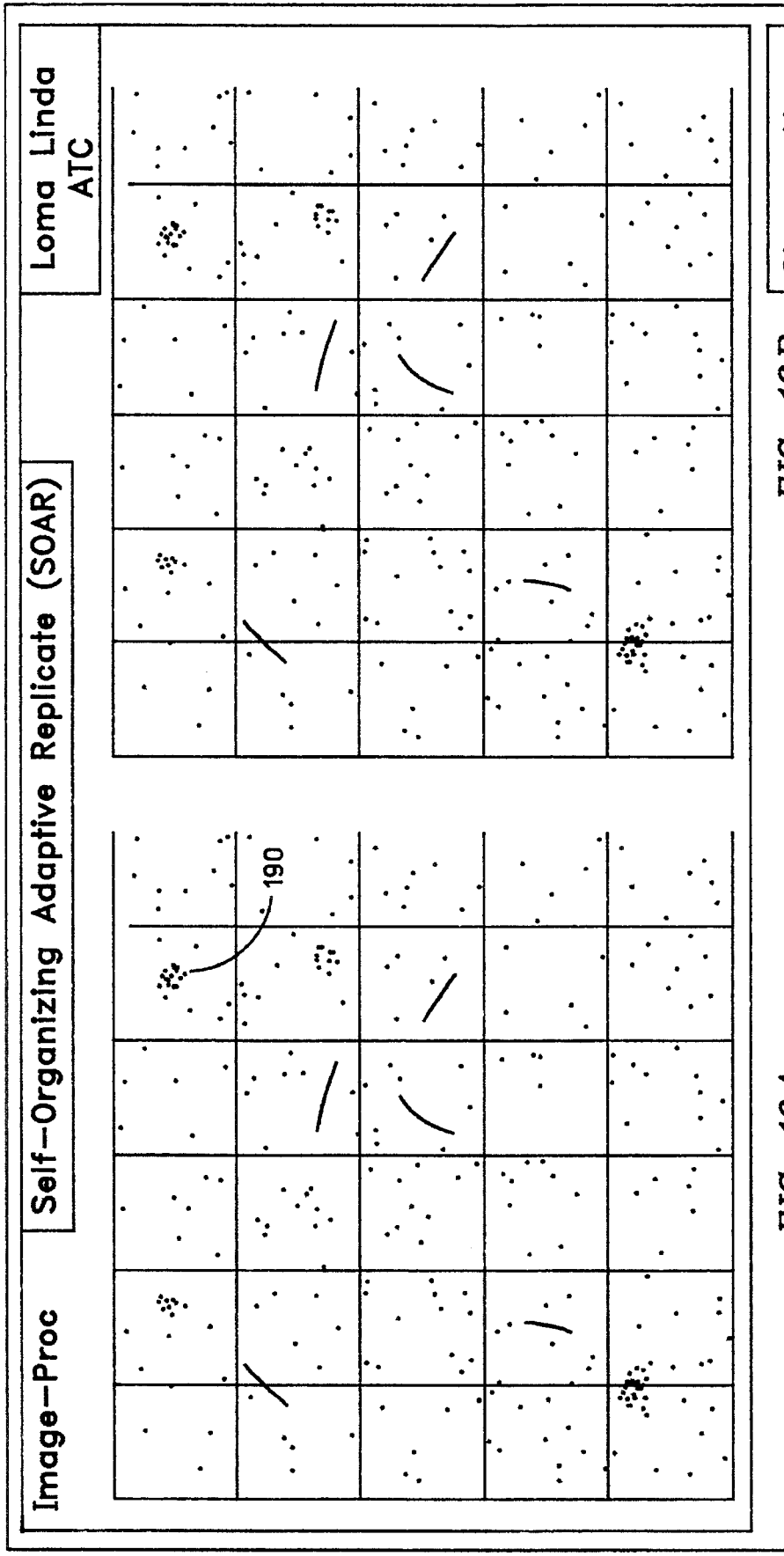
FIGS. 16A & B depict images used for pattern recognition in the Type 2 system shown in FIG. 15.

In response to this image, the user moves the mouse 170, the location of which is determined in step 184 and selects an image subframe 186 to produce a format response vector 188 which defines the blob or line targets subframe of interest in the image. For example, if the blob of interest is the one designated 190 in FIG. 16, the user will move the mouse to that location in the image. The SOAR receives the pre-processed image as well as the format response vector 188 for training. Once trained with a plurality of examples, the trained SOAR can be tested 191 and the response vector produced in response to a given image 172 is gathered 192 and the selected subframe highlighted 194 and displayed 196. In trials on the SOAR, the SOAR was able to process a 300×250 pixel image having a clutter level of 300 uniformly distribute objects of random size successfully. The target size was 7 to 12 pixels per side, with 15 color and 30 subframes per image.

Figure 17:
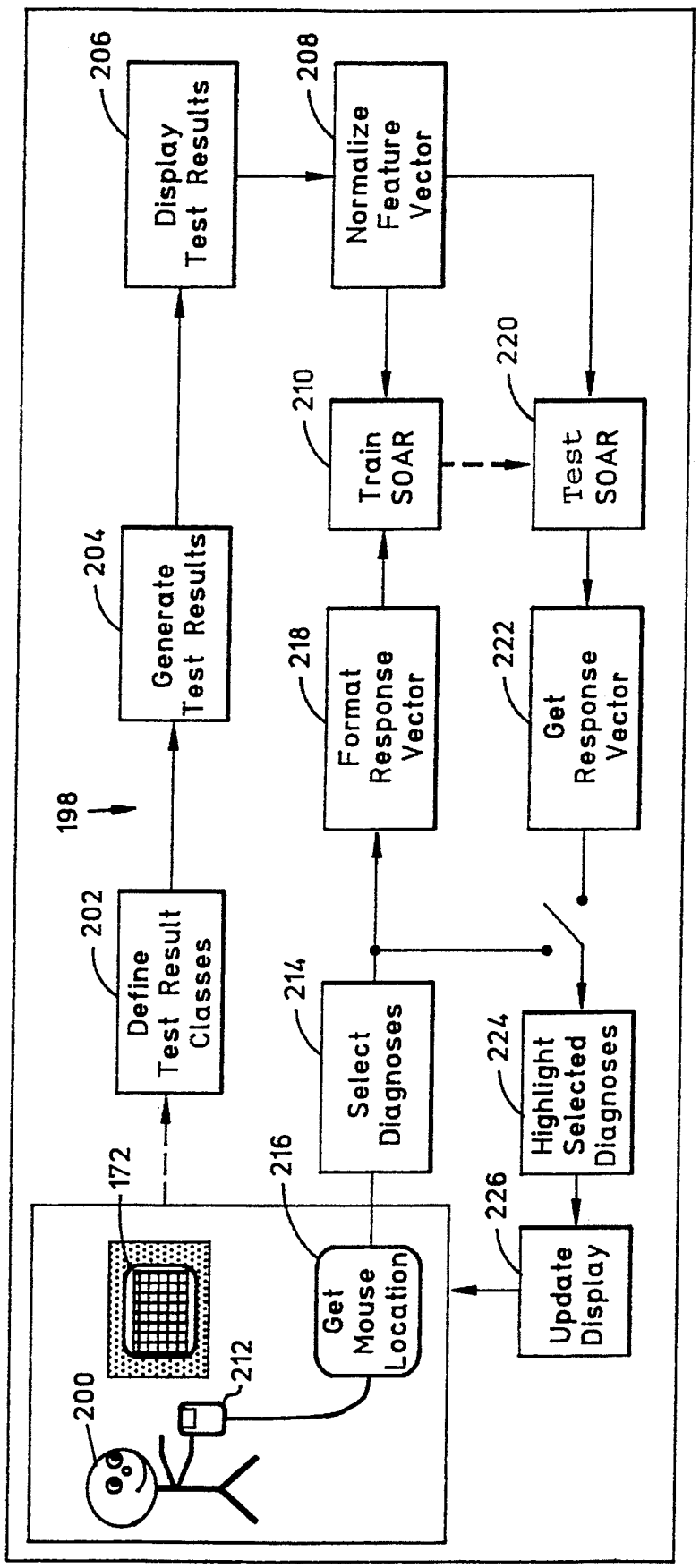
FIG. 17 is a diagram of a Type 3 system utilizing SOAR for pattern recognition of multi-feature data.

Referring to FIG. 17 a Type 3 system 198 is illustrated which performs pattern recognition of multi-feature data. The purpose of this system is to select a diagnosis as a function of test result combinations. Here a user 200 classifies various test results into diagnosis classes. These classes are defined in step 202 and the results generated in step 204 and displayed in step 206. The resulting feature vector is normalized in step 208 and is used to train the SOAR in step 210. Using a mouse 212 the user selects a diagnosis 214 in response to the test results. The mouse location 216 along with the selected diagnosis are use to comprise a response vector 218 which is also used to train the SOAR 210.

Once trained, the SOAR may be tested 220 by inputting a feature vector 208 into the SOAR and using the SOAR output to generated a response vector 222 to highlight the diagnosis 224 that is chosen by the SOAR. This highlighted diagnosis then updates the display in step 226. As shown at the top of FIG. 18 for a given test result, the user has selected diagnosis number 2 and has also indicated a recommendation that test alpha be performed. Likewise, the trained SOAR, given the test results in the lower portion of FIG. 18, produces the same result (diagnosis number 2) along with the recommendation of performing the test alpha. In one test, the number of tests was 5, the tests were continuously valued and the number of potential diagnoses were 5 with binary diagnosis selections. The results shown that the SOAR was auto-trained to nearly 100% performance on 4 different arrangements (classes) of test result combinations.

Figure 19:
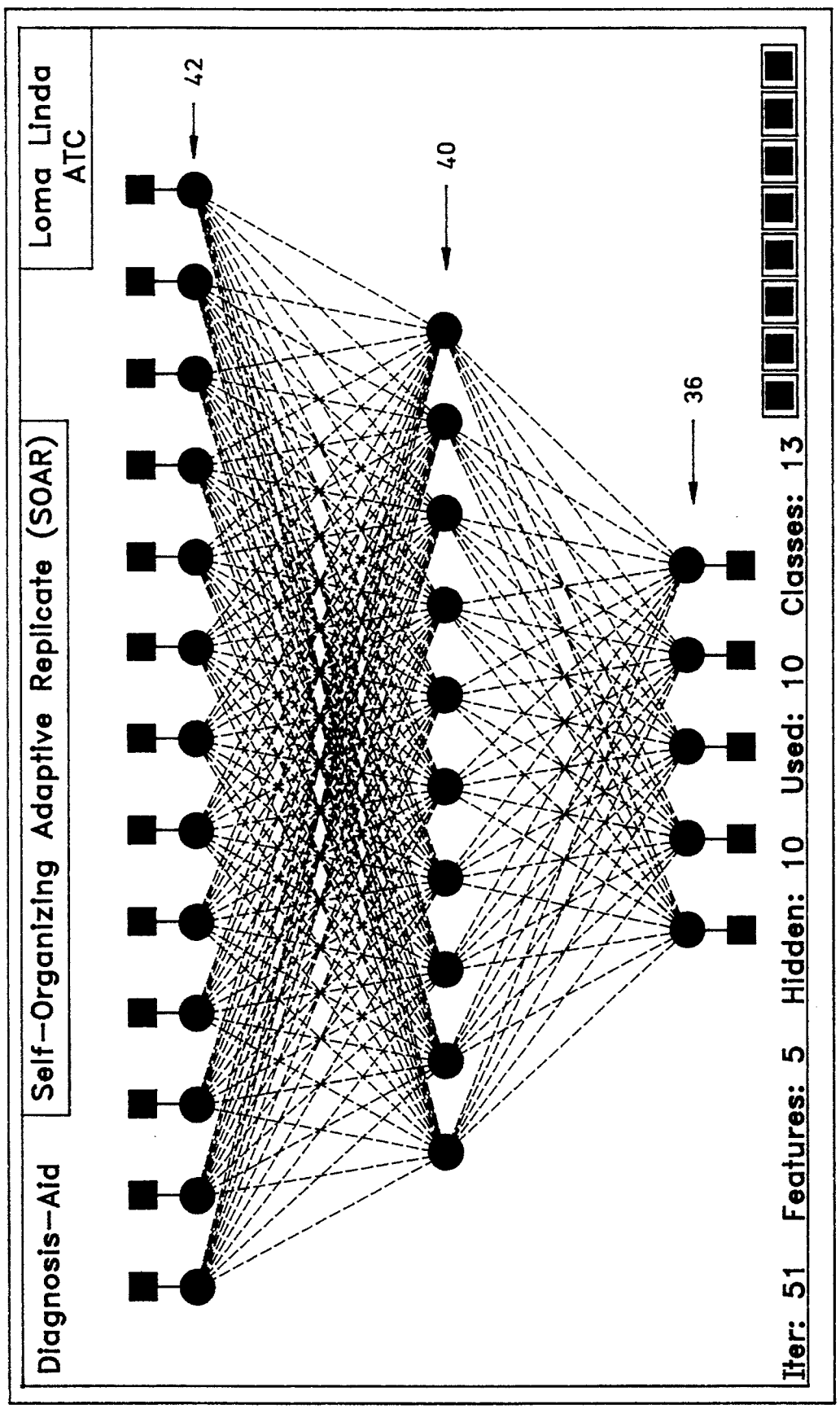
FIG. 19 is a diagram of the SOAR architecture shown in FIG. 4 after training in the Type 3 system of FIG. 17.

FIG. 19 illustrates an example of the SOAR architecture which resulted from the use of the SOAR in the Type 3 system 198. Since there were 5 different tests which comprised the input feature vector, this figure shows that there are 5 input nodes. The 13 output nodes 42 correspond to 13 output response vectors, each corresponding to one of the five specified diagnosis. Note that there may be multiple output nodes having identical output response vectors. In the course of training, the SOAR generated 10 hidden nodes 40.

Figure 20:
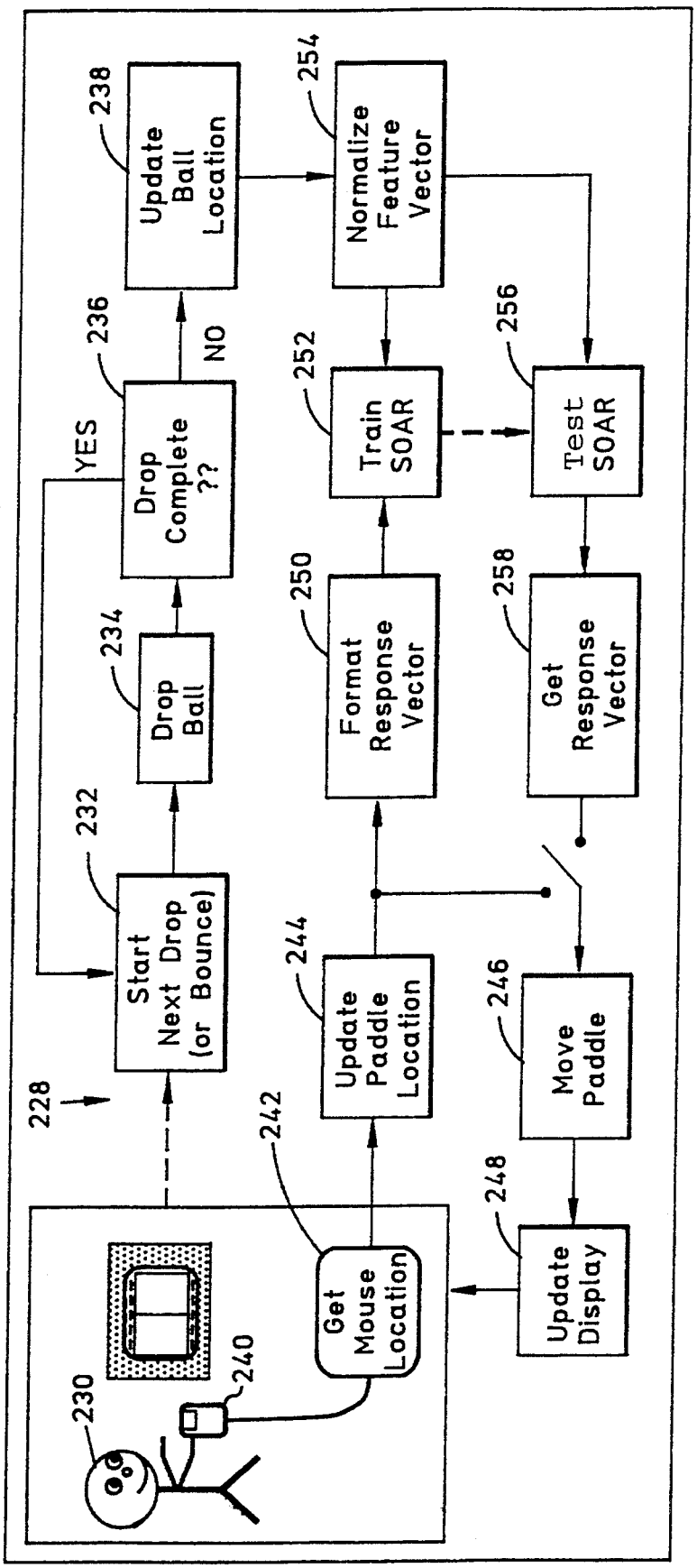
FIG. 20 is a diagram of a Type 4 system utilizing a SOAR to perform electro-mechanical sub-system control.

FIG. 20 illustrates a Type 4 system 228 for electromechanical subsystem control. The goal of this system is to move a paddle to either hit a ball or to hit a Type 1 ball and avoid a Type 2 ball. Here the input feature vector is the x,y position of the ball and the response vector is the x position of the paddle. The user 230 watches on a video screen as a game routine begins a ball drop 232, drops the ball 234 and determines if the drop was complete 236. If it was, the above three steps are repeated, if the drop was not completed due to the hitting of the ball by the paddle, the update ball location step 238 is performed.

The user hits the ball by using a mouse 240, its location is determined in step 242, and the paddle location is determined in step 244. The paddle is moved 246 and the display updated 248 to the new paddle location. The response (updated paddle location) by the user is stored in format response vector 250 and used to train the SOAR in step 252. Also, the feature vector of the ball location which gives rise to the paddle motion is fed to the SOAR from step 254. Once trained, the SOAR may be tested 256 to determine what its response vector 258 is, in response to movement of the ball. This response vector is then used to move the paddle 246 and update the display 248.

Figure 21:
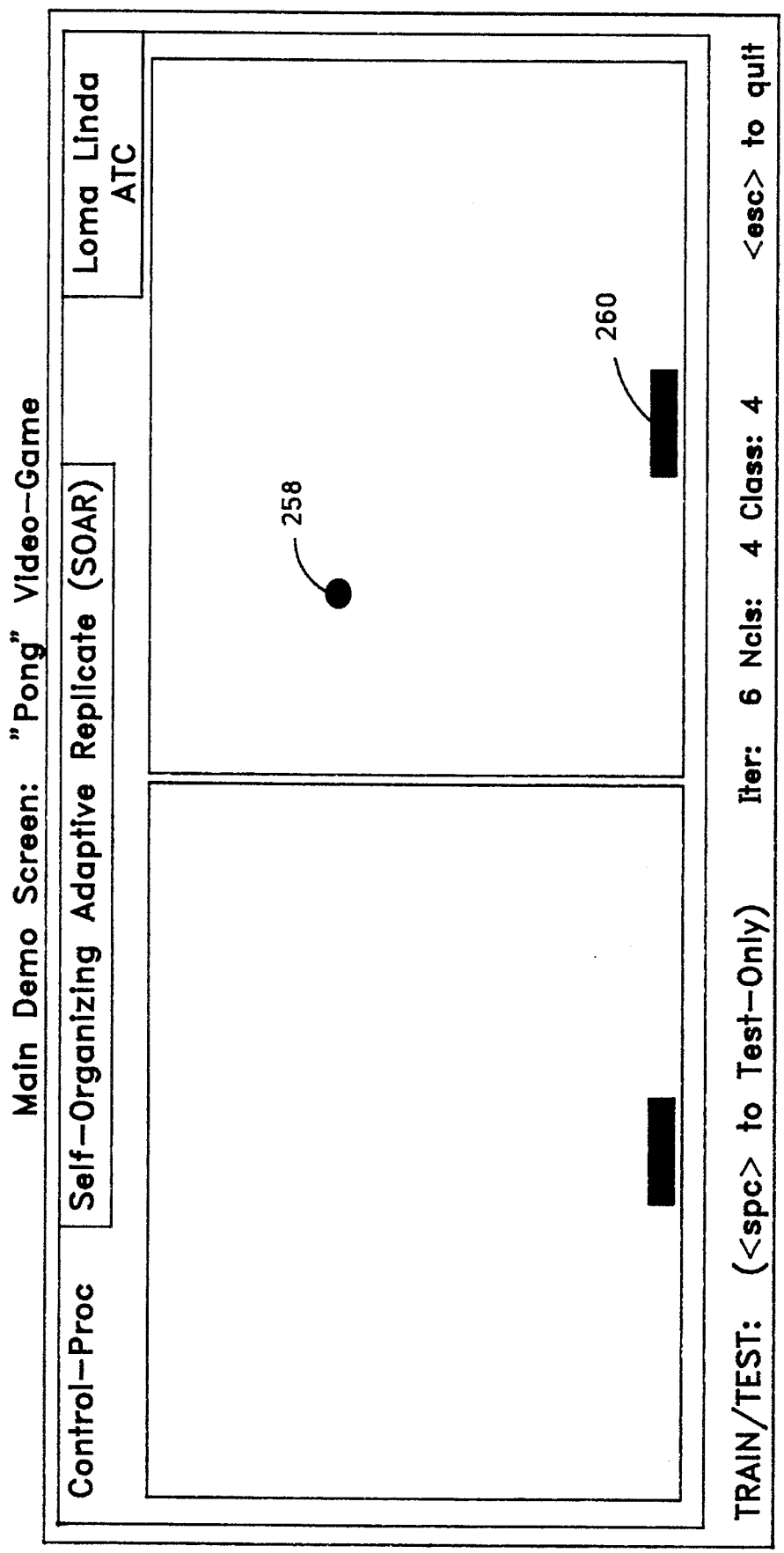
FIG. 21 is a display of a pong-type video game processing by the Type 4 system of FIG. 20.

The ball 258 and paddle 260 are illustrated in FIG. 21. Results have shown that the SOAR can be quickly trained to almost 100% performance on both the task of hitting the ball and the task of hitting a type 1 ball and avoiding a type 2 ball. In this example, the ball was dropped at a random angle, at a fixed speed, and some random error was used in training. The ball also bounced off the vertical and top walls.

Figure 22:
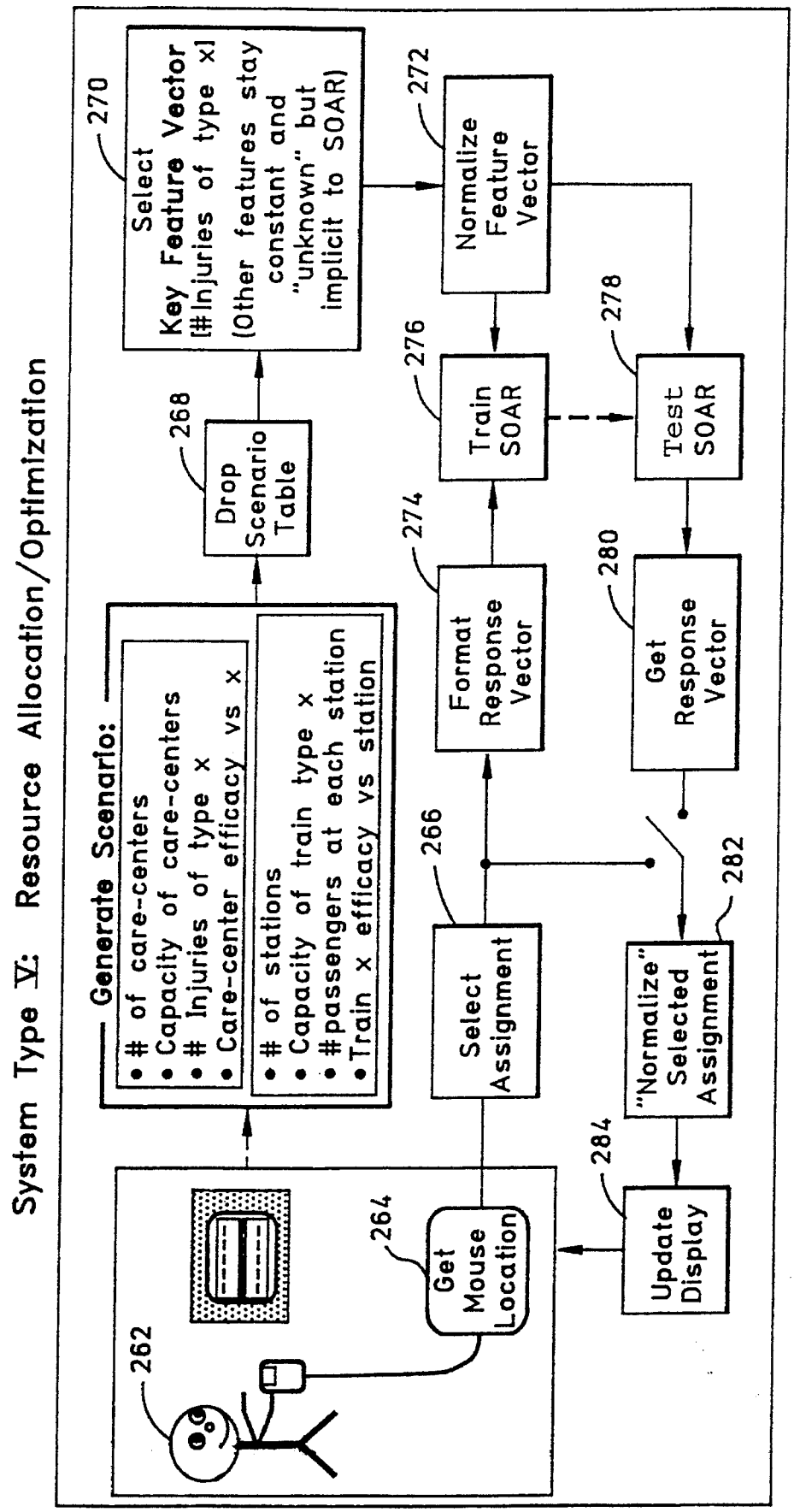
FIG. 22 is a Type 5 system utilizing a SOAR to perform resource allocation and optimization.

In the Type 5 system the SOAR is used for resource allocation and optimization as shown in FIG. 22. In this scenario, the system determines an optimum resource allocation for a variety of hospitals each having various capacities to handle various types of trauma in a large scale emergency situation. In this scenario, the primary factors include the number of care centers; the capacity of the care centers; the number of injuries of each type, and the care center efficacy for each injury type. In an alternative embodiment, the SOAR may also be used to schedule trains where the primary variables include the number of trains stations; the capacity of each train type; the number of passengers at each station; and the efficacy of each train type versus the train station.

Returning to the hospital allocation example, the user 262, using a mouse 246, selects an assignment 266 which defines the number of trauma patience of each type which are assigned to each hospital. This assignment is made by the user in response to the scenario table 268 which generates the key feature vector 270 that is normalized 272. The key feature vector comprises the number of injuries of a given type. Using the selected assignment which comprises a format response vector 274 and the feature vector 272, the SOAR is trained instep 276. Once trained, the SOAR may be tested 278 to produce a given response vector 280 in response to a feature vector 272. This response vector comprises a selected assignment 282 which is used to update the display 284. FIG. 23 illustrates an example assignment.

At the top of FIG. 23 are the results performed by a user. To explain these results, there are 17 patients with trauma 1 type injury and hospital A has a capacity of 3 for all 3 types of traumas. The efficacy of hospital A for trauma 1 is highest (0.68) and 3 of the 17 trauma 1 patients are allocated there. The other 14 trauma 1 patients are allocated to hospital C which has a 0.99 efficacy for that trauma. A fitness measure of this assignment results in a fitness of 0.61.

The trained SOAR results are shown at the bottom of FIG. 23. The assignment for hospital A, C and d are identical and slightly different for hospitals B and E. The overall fitness of the assignment achieved by the SOAR is 0.59. These results where achieved after 103 iterations in which 32 classes were generated.

It should be noted that the above examples of the five system types represent but a small segment of the possible applications of the SOAR system of the present invention. In these and other applications, the SOAR system has many advantages. With its distributed architecture it is able to handle noisy or corrupted input and network conditions. It is capable of generalization because its weights correspond to centroids in classification space. Thus it adapts to the true structure of classification space as represented by its training examples. The SOAR is a general purpose since it can be applied to nearly any system function. It has a number of training options including on the job, off-line via expert, or off-line via an explicit algorithm. Its results are repeatable and dependable and, due to its small size and speed, it runs invisibly out of the user's sight. The M dimensional output response vector at each node can be of any length. Thus, it is able to adapt readily to a wide variety of output and control tasks. Also, the adaptive output response vector will adapt over time as a function of the user's response, although it could be held fixed if desired. The non-linear hidden layer of the three layer perceptron guarantees arbitrary M to N mapping of continuous spaces.

The SOAR exhibits vary rapid learning due to its competitive, additive, layer-independent weight-update learning rule. It also exhibits self-organization since the architecture grows as needed to map input spaces to output spaces. It could also be easily adapted to contract as needed. The architecture is simple to control since only two primary parameters (hrad and hrad2) control the basic SOAR behavior. Moreover, the SOAR replicates user behavior by learning to quickly adapt to nearly exactly mimic a user's behavior and changes in that behavior. Those skilled in the art can appreciate that other advantages can be obtained for the use of the invention and that modifications may be made without departing from the spirit of the invention after studying the specification, drawings and following claims.

I claim:

1. A neural network comprising:

a plurality of input nodes each receiving one or more input node inputs and producing an input node output;

a plurality of hidden nodes each receiving one or more hidden node inputs and producing a hidden node output, each of said hidden node outputs being a non-linear function of their respective hidden node inputs;

one or more output nodes, each receiving one or more output node inputs and producing an output node output;

first set of weighted connections coupling said input node outputs to said hidden nodes, the weights of said connections for each hidden node comprising an input weight vector;

second set of weighted connections coupling said hidden node outputs to said output nodes, the weights of said connections for each output node comprising a hidden node weight vector, wherein substantially every input node is connected to every hidden node, and substantially every hidden node is connected to every output node:

means for computing a set of first distance vectors that are a function of the difference between each input weight vector and an input feature vector comprising the inputs to said input nodes, said first distance vectors being fed to the hidden nodes as inputs;

means for computing a set of second distance vectors that are a function of the difference between each hidden node weight vector, and a vector comprising the outputs of said hidden nodes;

means for determining the smallest of the second distance vectors;

means for generating an output from the output node associated with the smallest second distance vector, whereby for each unique input feature vector one output node generates a response and; means for training said network in response to a training feature vector including, means for determining if the smallest of said first distance vectors is less than a predetermined threshold and, means for adjusting the weights for the hidden node weight vector associated with said smallest first distance vector so as to make said distance smaller if the smallest of said first distance vectors is less than the predetermined threshold.

2. The neural network of claim 1, wherein said means for computing a first distance vector and said means for computing said second distance vector both take the sum of the differences between each weight vector and each input vector, and divide the sum by the number of elements in the input vector.

3. The neural network of claim 1, wherein said hidden node output is a function of the first distance vector.

4. The neural network of claim 3, wherein said non-linear function generated by said hidden nodes takes the form $w2(m)=1/1+(\alpha(dist-0.5))$; and where $w2(m)$ is the output of hidden node m, $\alpha$ is an arbitrary damping scaler and dist is the distance between the input feature vector and the hidden node input weight vector.

5. The neural network of claim 1, wherein said means for training further comprises means for adjusting the weights in the hidden node weight vector according to the expression:

$$v[near,j]=\{((1-x_k)*v[near,j])+x_k*wk[j])\}$$

where: $x_k$ is a contribution factor, $wk[j]$ is the input feature vector, and $v[near,j]$ is the weight vector for the intermediate class "near".

6. The neural network of claim 5, wherein the contribution factor is calculated by the expression:

$$x_k=xsc1*(1/xn[near]).$$

7. The neural network of claim 1 further comprising means for adding and for expanding said first set of weighted connections to include said new hidden node when said smallest first distance vector is not less than said threshold, said hidden node created having an input weight vector which is a function of said input feature vector.

8. The neural network of claim 1, wherein said weight vector created for said new hidden node is equal to said input feature vector.

9. The neural network of claim 1, wherein said means for training further comprises:

means for determining if the smallest of said second distance vectors is less than a second predetermined threshold, and if so, for adjusting the weight of the output node weight vector associated with said smallest second distance vector so as to make said distance smaller.

10. The neural network of claim 9, wherein said means for training further comprises means for adjusting the weights for the output node weight vector according to the expression:

$$h[near,m]=\{((1-x_k)*h[near,m])+(x_k*w2[m])\}$$

where: $x_k$ is a contribution factor, $w2[m]$ is the output of hidden node m, and $h[near,m]$ is the output node weight vector.

11. The neural network of claim 9 further comprising means for adding a new output node and expanding said second set of weighted connections to include the new output node when the smallest second distance vector is not less than the second threshold, said new output node having a hidden node weight vector that is a function of said vector comprising the outputs of the hidden nodes.

12. The neural network of claim 11, wherein the hidden node weight vector the new output node has is the vector comprising the outputs of the hidden nodes.

13. The neural network of claim 1, wherein each output node vector generates an output which comprises a predetermined output response vector.

14. The neural network of claim 13, wherein said predetermined input response vector is acquired from the behavior of a separate system in response to said input vector.

15. The neural network of claim 14 further comprising interface means for receiving and storing the input and output relationships of said second system without interfering with the operation of said second system and further comprising means for using said stored input/output relationships to determine said input response vectors.

16. An adaptive replicate system comprising:

a plurality of input nodes each receiving one or more input node inputs and producing an input node output;

a plurality of hidden nodes each receiving one or more hidden node inputs and producing a hidden node output, each of said hidden node outputs being a non-linear function of their respective hidden node inputs;

one or more output nodes each receiving one or more output node inputs and producing an output node output;

first set of weighted connections coupling said input node outputs to said hidden nodes, the weights of said connections for each hidden node comprising an input weight vector;

second set of weighted connections coupling said hidden node outputs to said output nodes, the weights of said connections for each output node comprising a hidden node weight vector, wherein substantially every input node is connected to every hidden node, and substantially every hidden node is connected to every output node;

means for computing a set of first distance vectors that are a function of the difference between each input weight vector and an input feature vector comprising the inputs to said input nodes, said first distance vectors being fed to the hidden nodes as input;

means for computing a set of second distance vectors that are a function of the difference between each hidden node weight vector, and a vector comprising the outputs of said hidden nodes, wherein said means for computing first distance vector and said means for computing said second distance vector both take the sum of the differences between each weight vector and each input vector, and divide the sum by the number of elements in the input vector;

means for determining the smallest of the second distance vectors;

means for generating an output from the output node associated with the smallest second distance vector, whereby for each unique input feature vectors one output node generates a response; and means for training said network in response to a training feature vector including: means for determining if the smallest of said first distance vectors is less than a predetermined threshold and, if so, for adjusting the weights for the hidden node weight vector associated with said smallest first distance vector so as to make said distance smaller.

17. A method for processing an input vector in a processor having a plurality of input nodes, a plurality of hidden nodes, one or more output nodes, a first set of weighted connections coupling said input nodes to said hidden nodes, the weights of said connections for each hidden node comprising an input weight vector; and a second set of weighted connections coupling said hidden nodes to said output nodes, the weights of said connections for each output node comprising a hidden node weight vector, wherein substantially every input node is connected to every hidden node and substantially every hidden node is connected to every output node, the method comprising the steps of:

receiving one or more inputs and producing one or more outputs which are a function of said inputs in each of said nodes, said hidden node outputs being a non-linear function of their inputs;

computing a set of first distance vectors that are a function of the difference between each input weight vector and an input feature vector comprising the inputs to said input nodes, said first distance vectors being fed to the hidden nodes as input;

computing a set of second distance vectors that are a function of the difference between each hidden node weight vector and a vector comprising the outputs of said hidden nodes;

determining the smallest of the second distance vectors; and generating an output from the output node associated with the smallest second distance vector, whereby for each unique input feature vector one output node generates a response.

18. The method of claim 17 further comprising the steps of:

training said network in response to a training feature vector by determining if the smallest of said first distance vectors is less than a predetermined threshold and, if so, for adjusting the weights for the hidden node weight vector associated with said smallest first distance vector so as to make said distance smaller.

* * * * *